(12) United States Patent
Rofougaran

(10) Patent No.: US 8,279,803 B2
(45) Date of Patent: *Oct. 2, 2012

(54) COMPUTING UNIT WITH FEMTOCELL AP FUNCTIONALITY

(75) Inventor: Ahmadreza (Reza) Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 596 days.

This patent is subject to a terminal disclaimer.

(21) Appl. No.: 12/495,212

(22) Filed: Jun. 30, 2009

(65) Prior Publication Data

US 2009/0264124 A1 Oct. 22, 2009

Related U.S. Application Data

(63) Continuation-in-part of application No. 12/026,681, filed on Feb. 6, 2008.

(51) Int. Cl.
*H04W 4/00* (2009.01)
(52) U.S. Cl. ...................................................... 370/328
(58) Field of Classification Search .................. 370/328
See application file for complete search history.

(56) References Cited

U.S. PATENT DOCUMENTS

| 8,125,959 | B2* | 2/2012 | Rofougaran | 370/331 |
|---|---|---|---|---|
| 2008/0076412 | A1* | 3/2008 | Khetawat et al. | 455/432.1 |
| 2008/0244148 | A1* | 10/2008 | Nix et al. | 710/313 |
| 2009/0042536 | A1* | 2/2009 | Bernard et al. | 455/406 |
| 2009/0164547 | A1* | 6/2009 | Ch'ng et al. | 709/201 |
| 2010/0120447 | A1* | 5/2010 | Anderson et al. | 455/456.1 |

* cited by examiner

*Primary Examiner* — Ayaz Sheikh
*Assistant Examiner* — Hai-Chang Hsiung
(74) *Attorney, Agent, or Firm* — Garlick & Markison; Holly L. Rudnick

(57) ABSTRACT

A computing unit includes a processing module, a baseband processing module, and a RF section. In a femtocell AP mode, the processing module performs at least a portion of a MAC function to facilitate signal conversion between radio interface (RI) signals and PHY AP signals. The baseband processing module converts signals between the PHY AP signals and AP symbol stream. The RF section converts signals between the AP symbol streams and RF AP signals. In a cellular (CELL) mode, the processing module facilitates conversions between data and PHY CELL signals. The baseband processing module converts signals between PHY CELL signals and CELL symbol streams. The RF section converts signals between CELL symbol streams and RF CELL signals.

20 Claims, 15 Drawing Sheets

COMPUTING UNIT WITH FEMTOCELL AP FUNCTIONALITY

This patent application is claiming priority under 35 USC §120 as a continuation in part patent application of co-pending patent application entitled COMPUTING DEVICE WITH HANDHELD AND EXTENDED COMPUTING UNITS, having a filing date of Feb. 6, 2008, and a Ser. No. 12/026,681.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to communication systems and more particularly to computing devices used in such communication systems.

2. Description of Related Art

Communication systems are known to support wireless and wire lined communications between wireless and/or wire lined communication devices. Such communication systems range from national and/or international cellular telephone systems to the Internet to point-to-point in-home wireless networks to radio frequency identification (RFID) systems. Each type of communication system is constructed, and hence operates, in accordance with one or more communication standards. For instance, wireless communication systems may operate in accordance with one or more standards including, but not limited to, IEEE 802.11, IEEE 802.15.4, Bluetooth, global system for mobile communications (GSM), wideband code division multiplexing (WCDMA), enhanced data rates for GSM evolution (EDGE), universal mobile telecommunications system (UMTS), long term evolution (LTE), IEEE 802.16, evolution data optimized (EV-DO), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

An issue arises for indirect wireless communications when one or more of the wireless communication devices are indoors. In this instance, the structure of a building impedes wireless transmissions, which decreases the wireless communication device's ability to communication with a base station or access point. To address this issue, the wireless communication industry is creating standards for the deployment of femtocells. In general, a femtocell is a small cellular base station designed for in-building use that connects to the core mobile network via the internet. A typical femtocell supports a small number of users (e.g., 2-6 cell phones).

As femtocells are introduced to the market, there are many deployment challenges. One challenge is producing economical femtocells. Another challenge is the portability of femtocells. For example, the size and transportability of a femtocell are issues that affect the ability to easily use a femtocell at various locations (home, office, on vacation, etc.). Other challenges include processing of cellular telephone calls, interference, etc.

Therefore, a need exists for a computing unit that includes femtocell functionality and that addresses one or more of the above challenges and/or other femtocell technological challenges and/or deployment challenges.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

DETAILED DESCRIPTION OF THE INVENTION

Figure 1:
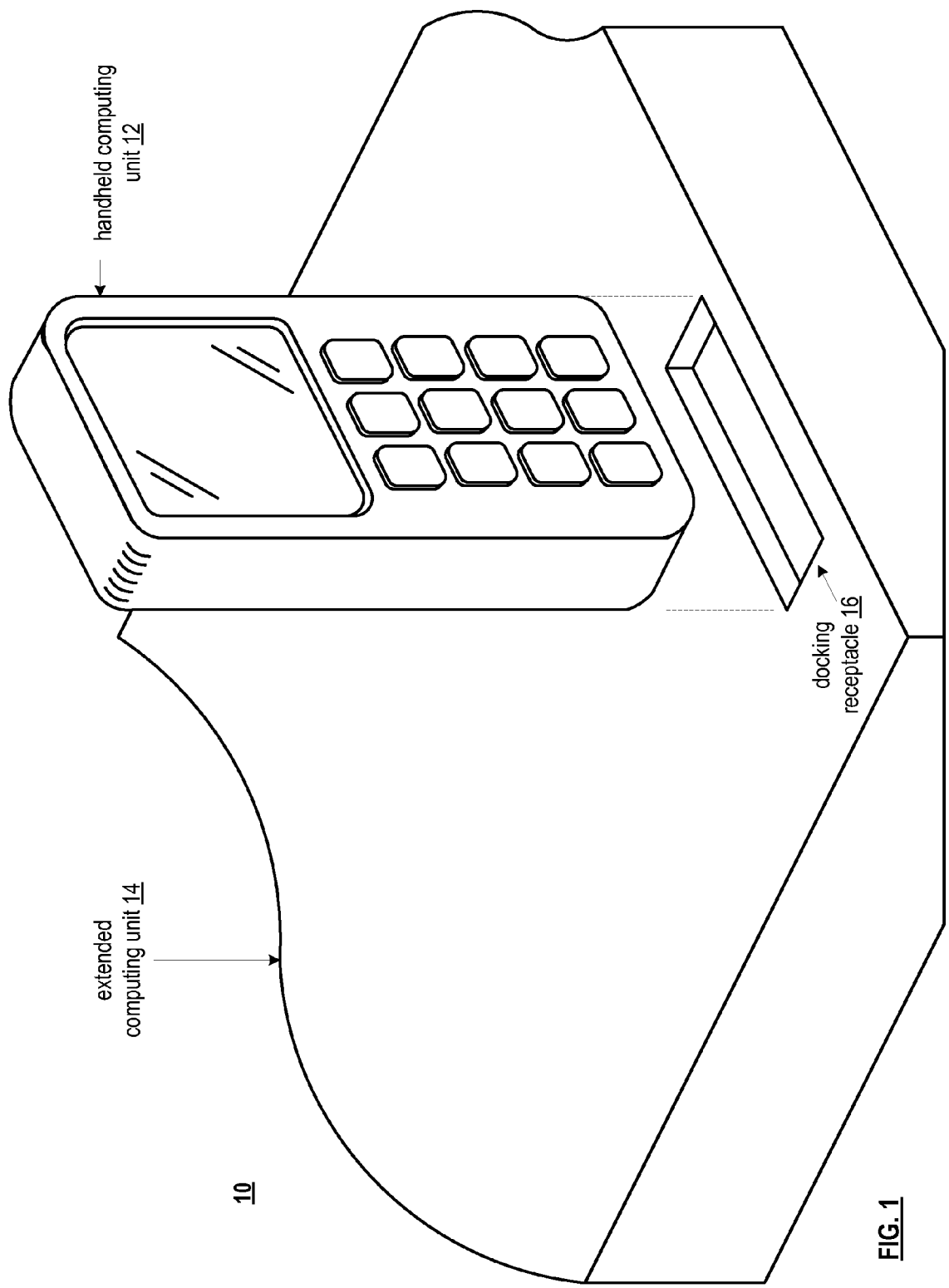
FIG. 1 is a schematic block diagram of an embodiment of a computing device in accordance with the present invention.

FIG. 1 is a diagram of an embodiment of a computing device 10 that includes a handheld computing unit 12 and an extended computing unit 14. The handheld computing unit 12 may have a form factor similar to a cellular telephone, personal digital assistant, personal digital audio/video player, etc. and includes a connector structure that couples to a docketing receptacle 16 of the extended computing unit 14 (e.g., a docking interface). The connector structure and docketing receptacle may be wired (e.g., male and female connectors), wireless transceivers (e.g., Bluetooth, ZigBee, 60 GHz, etc.), and/or magnetic coils.

In general, the handheld computing unit 12 includes the primary processing module (e.g., central processing unit), the primary main memory, and the primary hard disk memory for the computing device 10. In this manner, the handheld computing unit 12 functions as the core of a personal computer (PC) or laptop computer when it is docked to the extended computing unit and functions as a cellular telephone, a GPS receiver, a personal digital audio player, a personal digital video player, a personal digital assistant, and/or other handheld electronic device when it is not docked to the extended computing unit. When the handheld computing unit 12 is docked to the extended computing unit 14, the computing device 10 may function as a femtocell access point (AP) as will be discussed below with reference to FIGS. 2-15.

In addition, when the handheld computing unit 12 is docked to the extended computing unit 14, files and/or applications can be swapped therebetween. For example, assume that the user of the computing device 10 has created a presentation using presentation software and both reside in memory of the extended computing unit 14. The user may elect to transfer the presentation file and the presentation software to memory of the handheld computing unit 12. If the handheld computing unit 12 has sufficient memory to store the presentation file and application, then it is copied from the extended computing unit memory to the handheld computing unit memory. If there is not sufficient memory in the handheld computing unit, the user may transfer an application and/or file from the handheld computing unit memory to the extended computing unit memory to make room for the presentation file and application.

With the handheld computing unit 12 including the primary components for the computing device 10, there is only one copy of an application and/or of a file to support PC functionality, laptop functionality, and a plurality of handheld device functionality (e.g., TV, digital audio/video player, cell phone, PDA, GPS receiver, etc.). In addition, since only one copy of an application and/or of a file exists (other than desired backups), special software to transfer the applications and/or files from a PC to a handheld device is no longer needed. As such, the processing module, main memory, and I/O interfaces of the handheld computing unit 12 provide a single core architecture for a PC and/or a laptop, a cellular telephone, a PDA, a GPS receiver, a personal digital audio player, a personal digital video player, etc.

Figure 2:
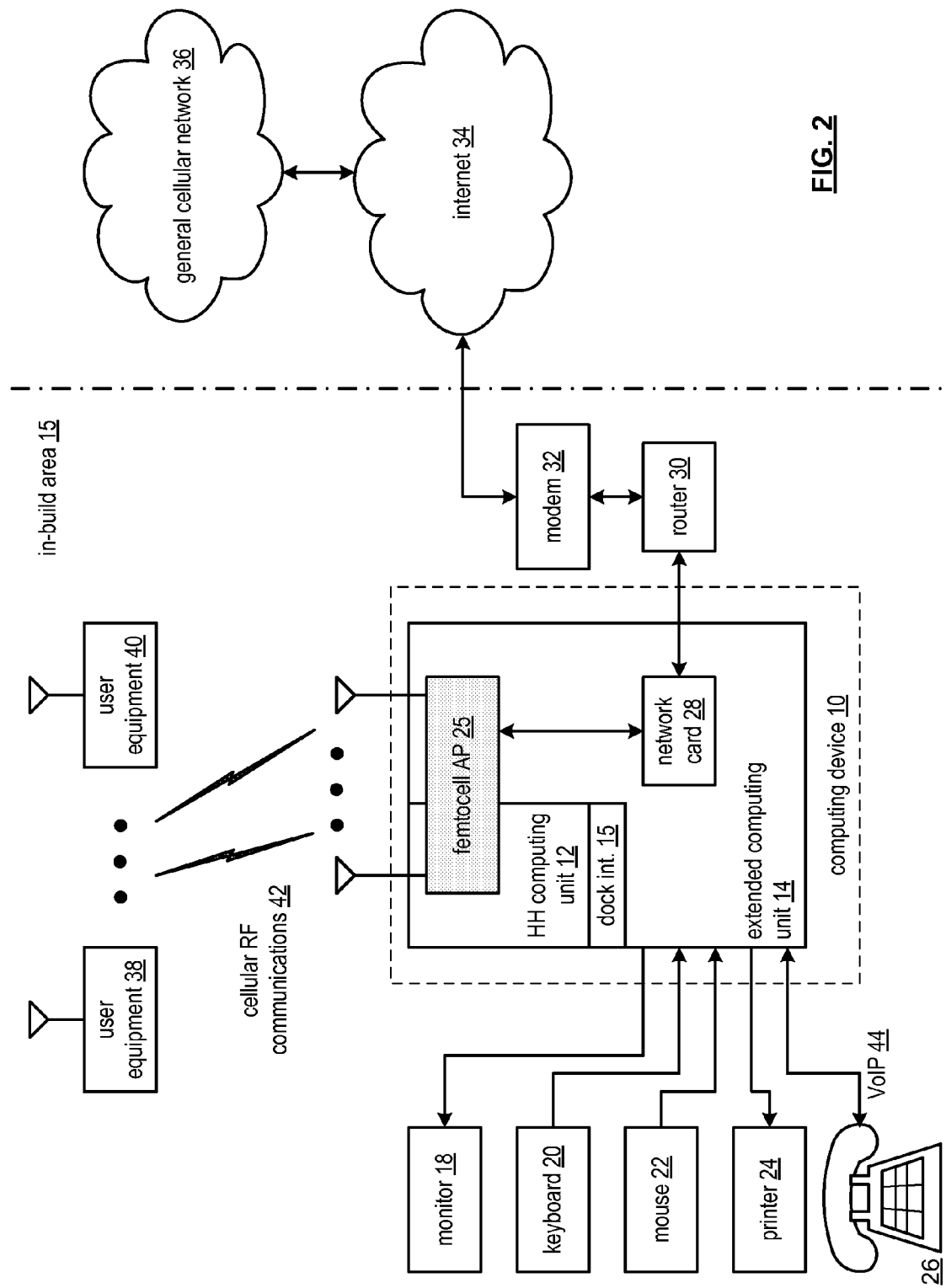
FIG. 2 is a schematic block diagram of an embodiment of a handheld computing unit coupled to an extended computing unit in accordance with the present invention.

FIG. 2 is a schematic block diagram of an embodiment of a computing device 10 that includes a handheld computing unit 12 coupled to an extended computing unit 14 via a docking interface 15. The extended computing unit 14 is coupled to one or more of a monitor 18, a keyboard 20, a mouse 22, a printer 24, and a voice over internet protocol (VoIP) phone 26 via one or more conventional interconnections. The extended computing unit 14 includes a network card 28 that is coupled to a modem 32 (e.g., DSL or cable) directly or via a router 30. The modem 32 is coupled to the internet 34, which is coupled to a general cellular network 36 (e.g., public switched telephone network, mobile core network for GSM, WCDMA, EDGE, UMTS, LTE, etc.).

The handheld (HH) computing unit 12 and the extended (EXT) computing unit 14 collectively function as a femtocell access point (AP) 25 to support two or more user equipment 38-40 (e.g., a cellular telephone, push to talk radio, etc.). In this instance, the femtocell AP 25 communicates with the general cellular network 36 via the network card 28, the modem 32, and the internet 34. The femtocell AP 25 functions in accordance with the 3GPP (third generation partnership project) TR 25.xxx specifications for 3G (third generation) systems (e.g., WCDMA) and/or 3GPP TR 45.xxx specifications for GSM systems (e.g., GSM, EDGE, etc.) to support cellular communications of the user equipment 38-50. Details of the HH computing unit 12, the EXT computing unit 14, and the femtocell AP 25 will be provided with reference to FIGS. 3-15.

Figure 3:
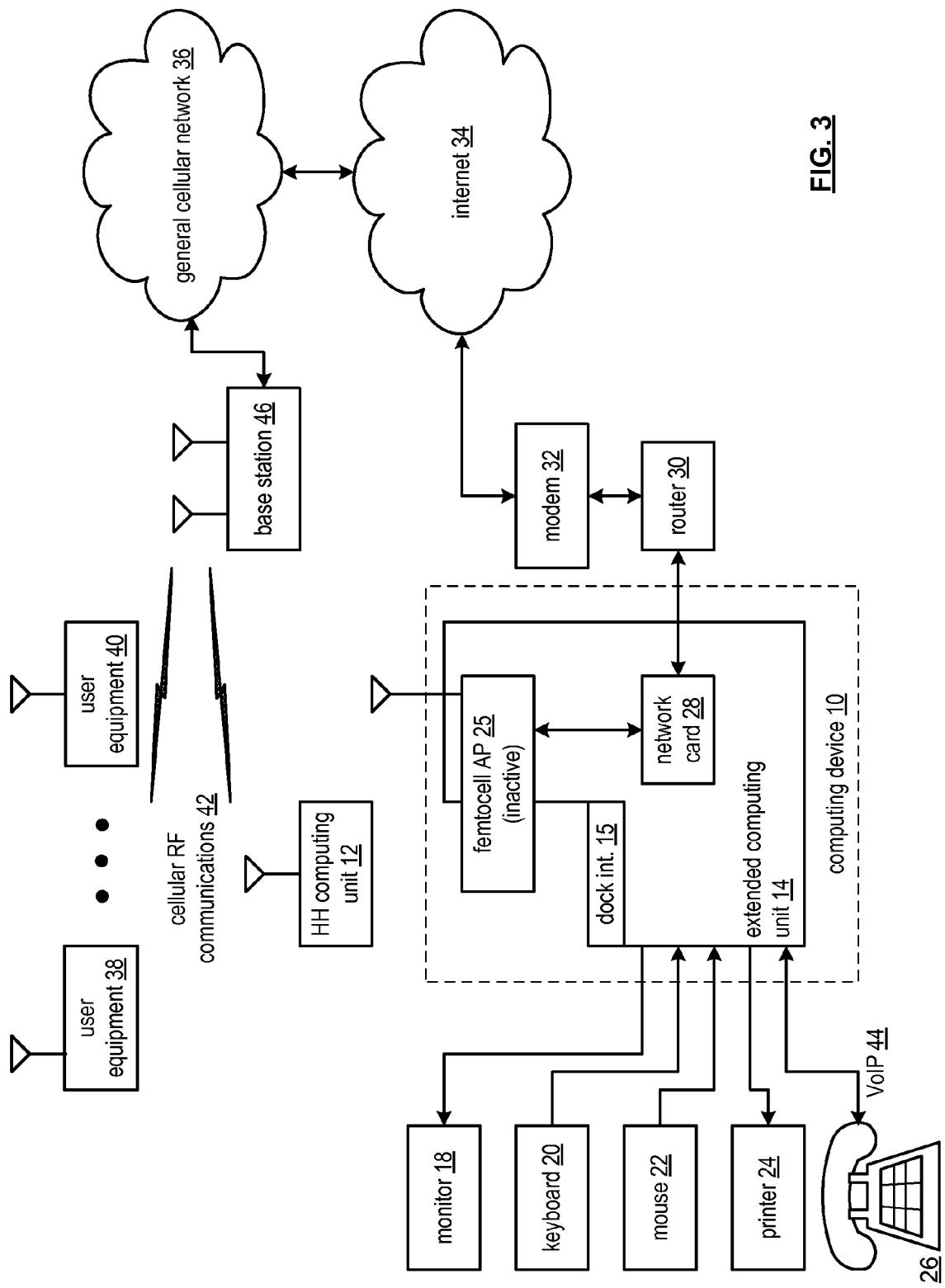
FIG. 3 is a schematic block diagram of an embodiment of a handheld computing unit that is not coupled to an extended computing unit in accordance with the present invention.

FIG. 3 is a schematic block diagram of an embodiment of a computing device 10 where the handheld computing unit 12 is not coupled to the extended computing unit 14. In this instance, the femtocell AP 25 is inactive and the HH computing unit 12 functions in a stand-alone mode as disclosed in the above referenced parent patent application. Accordingly, if the HH computing unit 12 desires to participate in a cellular communication, it registers and communicates with a base station 46. Similarly, user equipment 38-40 registers and communicates with base station 46 to participate in cellular communications.

Figure 4:
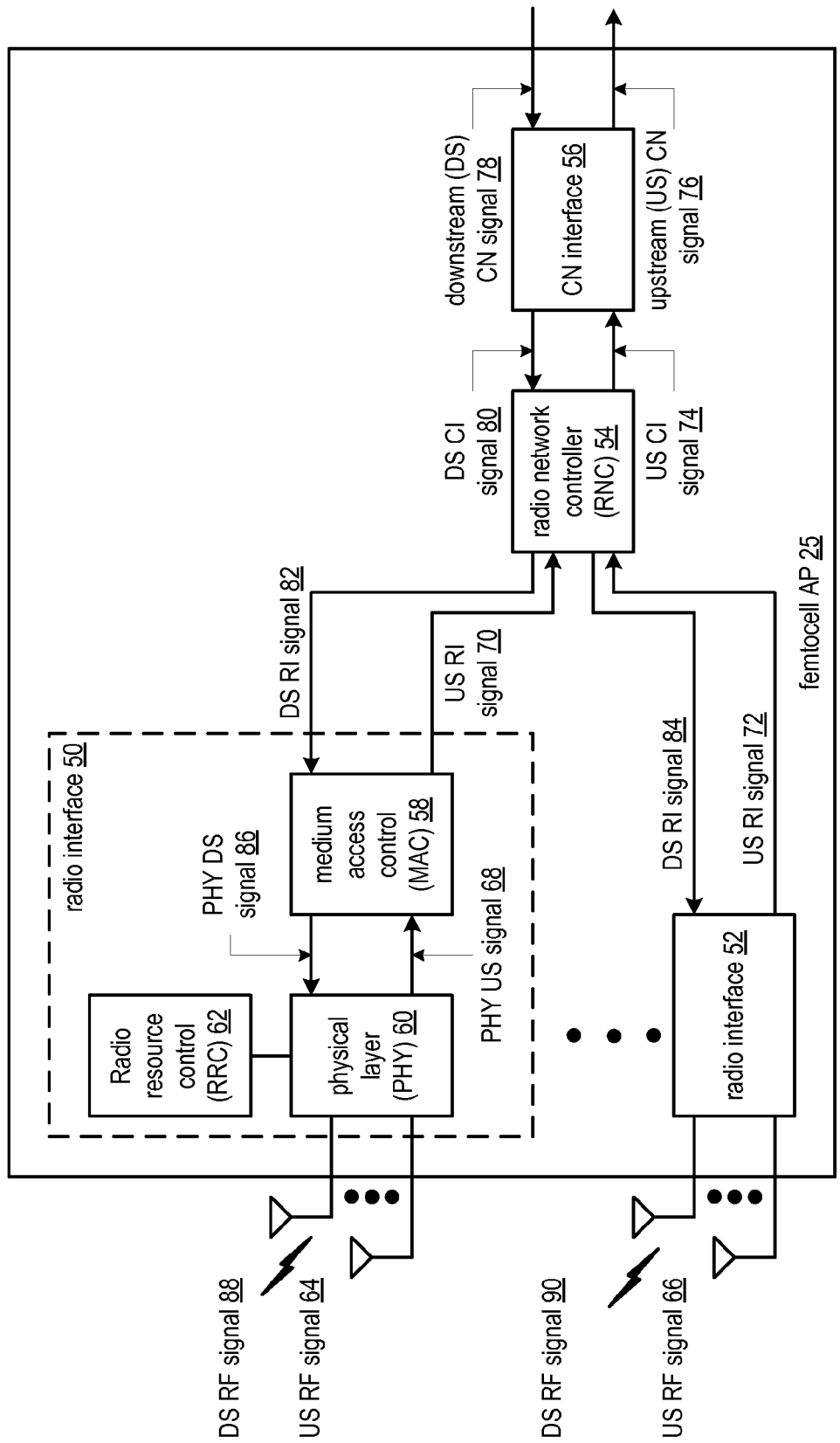
FIG. 4 is a schematic block diagram of an embodiment of a femtocell access point (AP) in accordance with the present invention.

FIG. 4 is a schematic block diagram of an embodiment of a femtocell access point (AP) 25 that includes a plurality of radio interfaces 50-52, a local radio network controller (RNC) 54, and a core network (CN) interface 56. Each of the radio interfaces 50-52 includes a medium access control (MAC) device 58, a physical layer (PHY) device 60, and a radio resource controller (RRC) 62.

In an example of operation, the CN interface 56 receives a downstream (DS) core network (CN) signal 76 from an upstream network component. For example, the upstream network component may be the core network (CN). The DS CN signal 76 is formatted in accordance with an internet protocol (IP) transmission scheme (e.g., TCP/IP, etc.). The content of the DS CN signal 76 includes user data and/or system data that is formatted in accordance with a particular cellular telephone interface protocol (e.g., 3GPP TS 25.410

UTRAN Iu Interface: General Aspects and Principles and other specifications referenced therein). The user data may be cellular network packets, or frames, of voice, text, data, video, audio, etc. data. The system data may include data for registering user equipment, resource allocation, resource management, etc. in accordance with one or more femtocell protocols (e.g., 3GPP TS 25.401 UTRAN overall description and specifications reference therein).

The CN interface 56 converts the DS CN signal 78 in a downstream (DS) CN interface (CI) signal 80. For example, the CN interface 56 recovers the content of the DS CN signal 78 by removing the IP transmission scheme overhead information. The CN interface provides the recovered CS CI signal 80 to the radio network controller (RNC) 54. Note that, in an embodiment, the CN interface 56 and the RNC 54 may collectively function as a HNB (Home Node B gateway).

The RNC 54 converts the DS CI signal 80 into one or more downstream (DS) radio interface (RI) signals 82-84. For instance, if the DS CI signal 80 includes user data and/or system data for more than one radio interface 50-52, then the RNC 54 partitions the signal for the respective radio interfaces 50-52. In general, the RNC 54 functions to perform at least a portion of radio resource management, mobility management, and encryption/decryption of data to/from the user equipment 38-40. Radio resource management includes one or more of outer loop power control, load control, admission control, packet scheduling, handover control, macro-diversity combining, securing functions, and mobility management for user equipment within the femtocell APs coverage area.

The MAC unit 58 receives the DS RI signal 82 and converts it into a physical layer (PHY) downstream (DS) signal 86. This may be done in accordance with one or more femtocell protocols. For example, the MAC unit 58 may convert the DS RI signal 82 into the PHY DS signal 86 in accordance with the 3GPP TS 25.301: Radio Interface Protocol Architecture.

The PHY unit 60 converts the PHY DS signal 86 into a downstream (DS) radio frequency (RF) signal 88 in accordance with one or more femtocell protocols. For example, the PHY unit 60 may convert the PHY DS signal 86 in the DS RF signal 88 in accordance with the 3GPP TS 25.301: Radio Interface Protocol Architecture. In an embodiment, the PHY unit 60 includes a baseband processing module and an RF section.

The radio resource control (RRC) unit 62 provides network layer functionality for the radio interface 50-52. For example, the RRC unit 62 may perform one or more of broadcast information related to non-access stratum, broadcast information related to access stratum, processing of an RRC connection, processing of radio bearers, processing radio resources for the RRC connection, performing RRC connection mobility functions, controlling requested quality of service, power control, processing initial cell selection and cell re-selection, arbitration of the radio resources on an uplink dedicate channel, RRC message integrity protection, cell broadcast service control, and multimedia broadcast multicast service control. Note that processing includes one or more of establishing, maintaining, reconfiguring, and releasing. Further note that functions performed by the RRC unit may be in accordance with one or more femtocell specifications (e.g., 3GPP TS 25.301: Radio Interface Protocol Architecture).

The PHY unit 60 also converts an upstream (US) RF signal 64 into a PHY US signal 68 in accordance with one or more femtocell protocols. The MAC unit 58 converts the PHY US signal 68 into a US RI signal 70 in accordance with one or more femtocell protocols (e.g., 3GPP TS 25.301: Radio Interface Protocol Architecture). Note that radio interface 52 converts a DS RI signal 84 into a DS RF signal 90 and converts a US RF signal 66 into a US RI signal 72 in a similar fashion as discussed with reference to radio interface 50.

The radio network controller (RNC) 54 converts the US RI signals 70-72 into a US CI signal 74 in accordance with one or more femtocell protocols (e.g., 3GPP TS 25.401 UTRAN overall description and specifications reference therein). The CN interface 56 converts the US CI signal 74 into a US CN signal 76. For example, the CN interface 56 formats the US CI signal 74 in accordance with an IP transmission scheme to produce the US CN signal 76. Note that the US CI signal 74 is formatted in accordance with a femtocell protocol (e.g., e.g., 3GPP TS 25.410 UTRAN Iu Interface: General Aspects and Principles and other specifications referenced therein).

Figure 5:
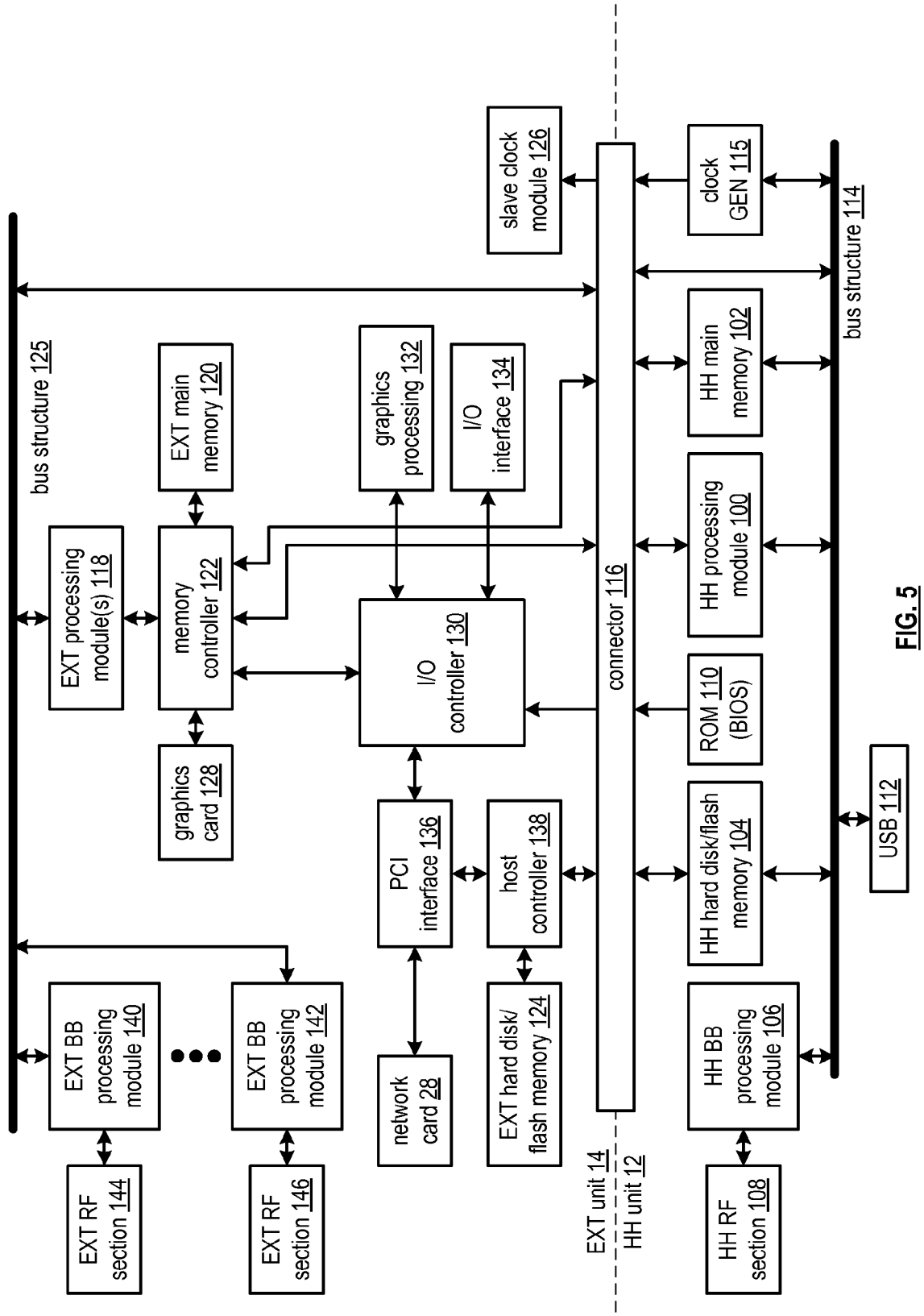
FIG. 5 is a schematic block diagram of an embodiment of a handheld computing unit and an extended computing unit in accordance with the present invention.

FIG. 5 is a schematic block diagram of an embodiment of core components of a handheld computing unit 12 coupled via connector 116 to an extended computing unit 14. The handheld (HH) computing unit 12 includes an HH processing module 100, an HH main memory 102, an HH hard disk/flash memory 104, a baseband processing module 106, an RF section 108, a ROM 110, a universal serial bus (USB) interface 112, a bus structure 114, and a clock generation circuit 115. The extended (EXT) computing unit 14 includes one or more EXT processing modules 118, an EXT main memory 120, a slave clock module 126, a memory controller 122, a graphics card 128 and/or a graphics processing unit 132, an I/O controller 130, an I/O interface 134, a peripheral component interconnect (PCI) interface 136, a host controller 138, an EXT hard disk/flash memory 124, the network card 28, a bus structure 125, a plurality of EXT baseband (BB) processing modules 140-142, and a plurality of RF sections 144-146.

The connector 116 provides the docking interface 15 between the HH and EXT computing units 12 and 14 and may include one or more wired connectors, one or more wireless interfaces, and/or one or more magnetic coupling interfaces. A wired connector may be a plug and socket connector, etc. A wireless interface may be supported by radio frequency (RF) and/or millimeter wave (MMW) transceivers that support one or more types of wireless communication protocols (e.g., Bluetooth, ZigBee, 802.11, 60 GHz, etc.). A magnetic coupling interface may be supported by transceivers with magnetic coils.

The bus structures 114 and 125 may each be wired and/or wireless buses. A wired bus may include 8 or more lines for data, for instructions, for control. A wireless bus may be implemented as an RF bus as described in co-pending patent application RF BUS CONTROLLER, having a filing date of Jan. 31, 2007, and a Ser. No. 11/700,285.

With handheld computing unit 12 docked to the extended computing unit 14, their components function as a single computing device 10. As such, when the computing device 10 is enabled, the BIOS stored on the HH ROM 110 is executed to boot up the computing device. The BIOS is discussed in greater detail with reference to FIGS. 19-26 of the parent patent application. After initializing the operating system, which is described in greater detail with reference to FIGS. 19-22 and 27-36 of the parent patent application, the computing device 10 is ready to execute a user application.

In an embodiment, the memory controller 122 coordinates the reading data from and writing data to the HH main memory 102 and the EXT main memory 120, by the processing modules 100 and 118, by the user I/O devices coupled directly or indirectly to the I/O controller 130, by the graphics card 128, and/or for data transfers with the HH and/or EXT hard disk/flash memory 104 and/or 124. Note that if the HH main memory 102 and/or the EXT main memory include DRAM, the memory controller 122 includes logic circuitry to refresh the DRAM.

The I/O controller 130 provides access to the memory controller 122 for typically slower devices. For example, the I/O controller 130 provides functionality for the PCI bus via the PCI interface 136; for the I/O interface 134, which may provide the interface for the keyboard, mouse, printer, and/or a removable CD/DVD disk drive; and BIOS interface; a direct memory access (DMA) controller, interrupt controllers, a host controller, which allows direct attached of the EXT hard disk memory; a real time clock, an audio interface. The I/O controller 130 may also include support for an Ethernet network card, a Redundant Arrays of Inexpensive Disks (RAID), a USB interface, and/or FireWire.

The graphics processing unit (GPU) 132 is a dedicated graphics rendering device for manipulating and displaying computer graphics. In general, the GPU implements a number of graphics primitive operations and computations for rendering two-dimensional and/or three-dimensional computer graphics. Such computations may include texture mapping, rendering polygons, translating vertices, programmable shaders, aliasing, and very high-precision color spaces. The GPU 132 may a separate module on a video card or it may be incorporated into the graphics card 128 that couples to the memory controller 122. Note that a video card, or graphics accelerator, functions to generate the output images for the EXT display. In addition, the video card may further include functionality to support video capture, TV tuner adapter, MPEG-2 and MPEG-4 decoding or FireWire, mouse, light pen, joystick connectors, and/or connection to two monitors.

The EXT baseband processing modules 140-142 and the RF sections 144-146 are operable when the HH computing unit is docked to the EXT computing unit. Each of the RF sections 144-146 includes a receiver section and a transmitter section. When operable, each combination of the EXT baseband processing modules 140-142 and the RF sections 144-146 provides at least a portion of a radio interface 50 of the femtocell AP 25. For example, EXT BB processing module 140 and EXT RF section 144 may provide the radio interface to user equipment 38.

The EXT processing module 118, the memory controller 122, the EXT main memory 120, the I/O controller 130, the I/O interface 134, the PCI interface 136, the host controller 138, the EXT baseband processing modules 140-142, and the EXT RF sections 144-146 may be implemented on a single integrated circuit, each on separate integrated circuits, or some elements may be implemented on the same integrated circuits. For example, the EXT processing module 118, at least one of the EXT baseband processing modules 140-142, and the memory controller 122 may be implemented on the same integrated circuit.

Figure 6:
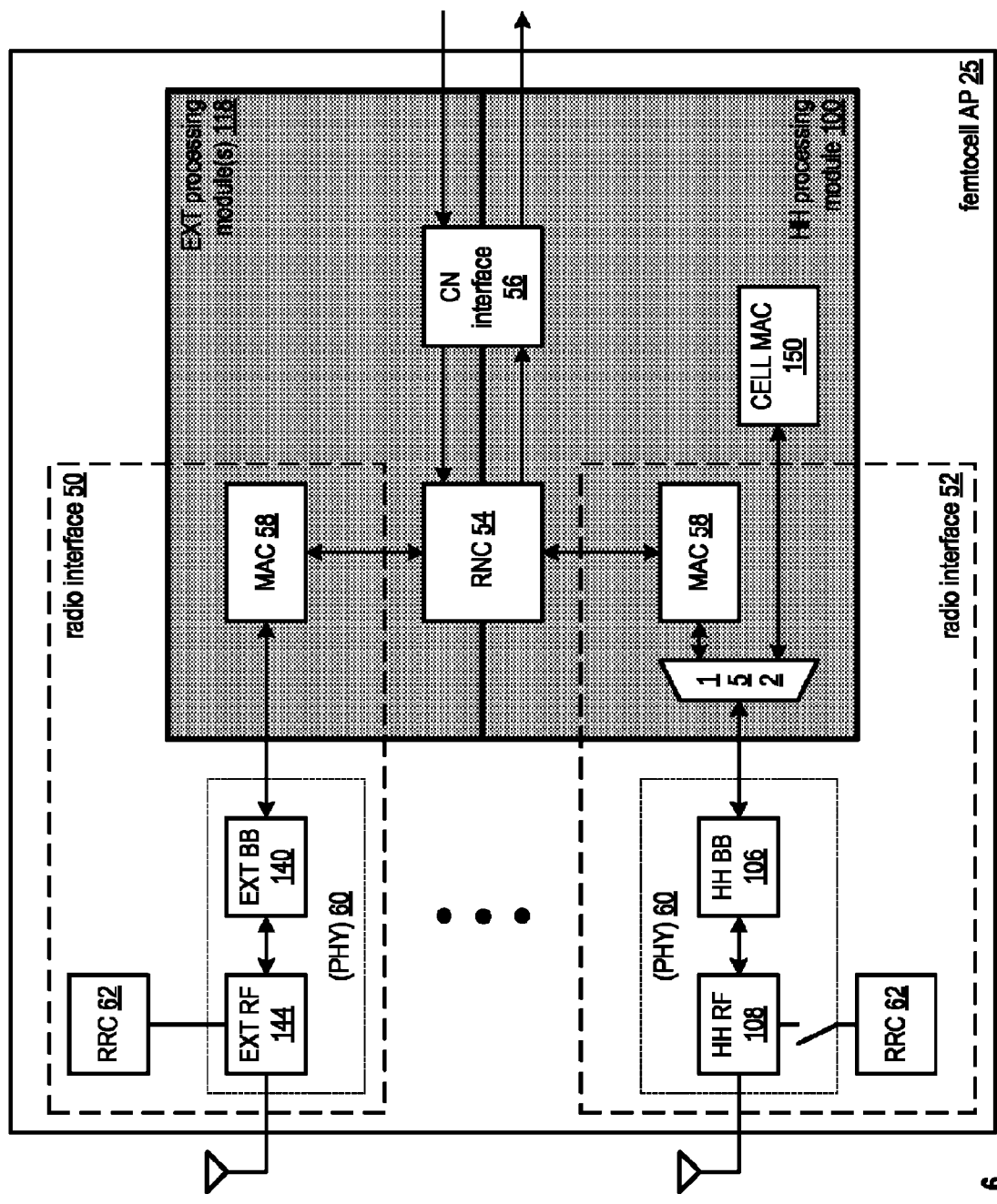
FIG. 6 is a schematic block diagram of an embodiment of a handheld computing unit and an extended computing unit implementing a femtocell AP in accordance with the present invention.

FIG. 6 is a schematic block diagram of an embodiment of a handheld (HH) computing unit 12 and an extended (EXT) computing unit 14 implementing a femtocell AP 25. The HH computing unit components include the HH processing module 100, the HH baseband processing module 106, and the HH RF section 108. The EXT computing unit components include the EXT processing module 118, the EXT baseband processing modules 140-142, and the EXT RF sections 144-146.

In this embodiment, a combination of the HH processing module 100 and the EXT processing module(s) 118 implements the core network (CN) interface 56 function and the local radio network controller (RNC) 54 function. In addition, the HH processing module 100 implements a cellular (CELL) MAC unit 150 and the MAC unit 58 for radio interface 52 and the EXT processing module(s) 118 implement the MAC unit 58 for the other radio interfaces 50. Further, the HH baseband processing module 100 and/or the HH processing module(s) 106 implements the radio resource control (RRC) unit 62 for the radio interfaces 52 and the EXT baseband processing module 140 and/or the EXT processing module(s) 118 implement the radio resource control (RRC) unit 62 of the other radio interfaces 50.

In an example of the HH and EXT computing units 12 and 14 implementing the femtocell AP 25, the femtocell AP 25 registers with the core network and registers the user equipment 38-40 in accordance with one or more femtocell protocols (e.g., 3GPP TS 25.467: UTRAN architecture for 3G Home Node B). After the registration processes, femtocell AP is ready to transceive user data and/or system data with the user equipment. For user and/or system data from the user equipment, the receiver section of EXT RF section 144 receives an upstream RF signal (e.g., signal 64 of FIG. 4) and amplifies it to produce an amplified upstream RF signal. The receiver section may then mix in-phase (I) and quadrature (Q) components of the amplified upstream RF signal with in-phase and quadrature components of a local oscillation to produce a mixed I signal and a mixed Q signal. The mixed I and Q signals are combined to produce an upstream symbol stream. In this embodiment, the upstream symbol may include phase information (e.g., +/−Δθ [phase shift] and/or θ(t) [phase modulation]) and/or frequency information (e.g., +/−Δf [frequency shift] and/or f(t) [frequency modulation]). In another embodiment and/or in furtherance of the preceding embodiment, the upstream RF signal includes amplitude information (e.g., +/−ΔA [amplitude shift] and/or A(t) [amplitude modulation]). To recover the amplitude information, the receiver section includes an amplitude detector such as an envelope detector, a low pass filter, etc.

The EXT baseband processing module 140 converts the upstream symbol stream into the PHY upstream signal (e.g., signal 68 of FIG. 4) in accordance with one or more cellular communication standards (e.g., GSM, CDMA, WCDMA, HSUPA, HSDPA, EDGE, GPRS, LTE, UMTS, EV-DO, etc.). Such a conversion may include one or more of: digital intermediate frequency to baseband conversion, time to frequency domain conversion, space-time-block decoding, space-frequency-block decoding, demodulation, frequency spread decoding, frequency hopping decoding, beamforming decoding, constellation demapping, deinterleaving, decoding, depuncturing, and/or descrambling.

In addition, the EXT baseband processing module 140, alone, in combination with the EXT RF section 144, and/or in combination with the EXT processing module(s) 118 facilitates one or more of macro-diversity distribution and combining; soft handover execution; error detection on transport channels; forward error correction encoding and decoding of the transport channels; multiplexing of the transport channels; demultiplexing of coded composite transport channels; rate matching of the coded transport channels to physical channels; mapping of the coded composite transport channels on the physical channels; power weighting and combining of the physical channels; modulation and spreading demodulation of the physical channels; de-spreading of the physical channels; frequency and time synchronization; beamforming; and Multiple Input Multiple Output (MIMO) transmission. Such additional functional processing is in accordance with one or more femtocell protocols (e.g., 3GPP TS 25.301: Radio Interface Protocol Architecture).

The EXT processing module(s) 118 implement the MAC unit 58, which converts the PHY upstream signal into an upstream radio interface (RI) signal (e.g., signal 70 of FIG. 4)

in accordance with one or more femtocell protocols (e.g., 3GPP TS 25.301: Radio Interface Protocol Architecture). The MAC unit 58 provides the upstream RI signal to the RNC 54.

While the EXT RF sections 144-146 and the EXT baseband processing modules 140-142 are converting upstream RF signals into upstream PHY signals, the HH RF section 108 and the HH baseband processing module 106 are performing a similar function for another user equipment. The HH baseband processing module 106 provides the upstream PHY signal to the MAC unit 58 via a multiplexer 152. The multiplexer 152 may be a logical multiplexer, a physical multiplexer, or a switching circuit that, when the computing unit is in the femtocell mode, the multiplexer 152 provides connectivity between the MAC unit 58 and the HH baseband processing module 106. When the computing unit is in the cellular mode, the multiplexer 152 provides connectivity between the CELL MAC unit 150 and the HH baseband processing module 106.

The MAC unit 58, which is being implemented by the HH processing module 100, processes the upstream PHY signal to produce an upstream RI signal. The MAC unit 58 provides the upstream RI signal to the RNC 54.

The EXT and/or the HH processing modules 100 and/or 118 implement the RNC 54, which converts the upstream (US) RI signals (e.g., signals 70-72 of FIG. 4) into a US core network interface (CI) signal (e.g., signal 74 of FIG. 4) in accordance with one or more femtocell protocols (e.g., 3GPP TS 25.401 UTRAN overall description and specifications reference therein).

The EXT and/or the HH processing modules 100 and/or 118 also implement the CN interface 56, which converts the US CI signal into a US core network (CN) signal (e.g., signal 76 of FIG. 4). For example, the CN interface 56 formats the US CI signal 74 in accordance with an IP transmission scheme to produce the US CN signal 76. Note that the US CI signal is formatted in accordance with a femtocell protocol (e.g., e.g., 3GPP TS 25.410 UTRAN Tu Interface: General Aspects and Principles and other specifications referenced therein).

The CN interface 56 provides the upstream CN signal to the core network (e.g., the general cellular network 36) via the internet 34. Accordingly, the CN interface 56 (as implemented by the HH and/or EXT processing modules) provides the upstream CN signal to the memory controller, which forwards the upstream CN signal to the network card directly or via the IO controller and the PCI interface.

For user and/or system data for the user equipment, the CN interface receives a downstream (DS) core network (CN) signal (e.g., signal 78 of FIG. 4) from the internet via the network card, the memory controller, and any other intervening components. The CN interface 56 converts the DS CN signal in a downstream (DS) CN interface (CI) signal (e.g., signal 80 of FIG. 4). For example, the CN interface 56 recovers the content of the DS CN signal 78 by removing the IP transmission scheme overhead information. The CN interface provides the recovered CS CI signal to the radio network controller (RNC) 54.

The RNC 54 converts the DS CI signal 80 into one or more downstream (DS) radio interface (RI) signals (e.g., signals 82-84 of FIG. 4). For instance, if the DS CI signal includes user data and/or system data for more than one user equipment and, hence more than one radio interface 50-52, the RNC 54 partitions the signal for the respective radio interfaces 50-52.

For DS RI signals for radio interface 50, the MAC unit 58 implemented by the EXT processing module(s) 118 converts the DS RI signal into a physical layer (PHY) downstream (DS) signal (e.g., signal 86 of FIG. 4). This may be done in accordance with one or more femtocell protocols. For example, the MAC unit 58 may convert the DS RI signal 82 into the PHY DS signal 86 in accordance with the 3GPP TS 25.301: Radio Interface Protocol Architecture.

The EXT baseband processing module 140 converts the DS PHY signal into a downstream symbol stream in accordance with one or more wireless communication standards (e.g., GSM, CDMA, WCDMA, HSUPA, HSDPA, EDGE, GPRS, LTE, UMTS, EV-DO, etc.). Such a conversion includes one or more of: scrambling, puncturing, encoding, interleaving, constellation mapping, modulation, frequency spreading, frequency hopping, beamforming, space-time-block encoding, space-frequency-block encoding, frequency to time domain conversion, and/or digital baseband to intermediate frequency conversion.

The transmitter section of EXT RF section 144 converts the downstream symbol stream into a downstream RF signal that has a carrier frequency within a given frequency band (e.g., 900 MHz, 1800-2200 MHz, etc.). In an embodiment, this may be done by mixing the downstream symbol stream with a local oscillation to produce an up-converted signal. One or more power amplifiers and/or power amplifier drivers amplifies the up-converted signal, which may be RF bandpass filtered, to produce the downstream RF signal. In another embodiment, the transmitter section includes an oscillator that produces an oscillation. The downstream symbol stream provides phase information (e.g., $+/-\Delta\theta$ [phase shift] and/or $\theta(t)$ [phase modulation]) that adjusts the phase of the oscillation to produce a phase adjusted RF signal, which is transmitted as the downstream RF signal. In another embodiment, the downstream symbol stream includes amplitude information (e.g., $A(t)$ [amplitude modulation]), which is used to adjust the amplitude of the phase adjusted RF signal to produce the downstream RF signal.

In yet another embodiment, the transmitter section includes an oscillator that produces an oscillation. The downstream symbol provides frequency information (e.g., $+/-\Delta f$ [frequency shift] and/or $f(t)$ [frequency modulation]) that adjusts the frequency of the oscillation to produce a frequency adjusted RF signal, which is transmitted as the downstream RF signal. In another embodiment, the downstream symbol stream includes amplitude information, which is used to adjust the amplitude of the frequency adjusted RF signal to produce the downstream RF signal. In a further embodiment, the transmitter section includes an oscillator that produces an oscillation. The downstream symbol provides amplitude information (e.g., $+/-\Delta A$ [amplitude shift] and/or $A(t)$ [amplitude modulation]) that adjusts the amplitude of the oscillation to produce the downstream RF signal.

The MAC unit 58 implemented by the HH processing module 100 converts the DS RI signal for the user equipment supported by radio interface 52 into a physical layer (PHY) downstream (DS) signal. The HH baseband processing module 106 converts the PHY DS signal into a downstream symbol stream, which is converted into a downstream RF signal by the HH RF section 108.

When the computing unit is in the cellular mode, the CN interface 56, the RNC 54, and the MAC units 58 implemented by the EXT processing module are disabled. Alternatively, these components may be active, where the EXT processing module 118 performs the CN interface 56 and the RNC 54 without contribution from the HH processing module 100. In the latter instance, the EXT computing unit 14 functions as the femtocell AP without the radio interface implemented by the components of the HH computing unit 12.

In the cellular mode, the components of the HH computing unit 12 function as a cellular telephone. In this mode, the CELL MAC unit 150 is active to provide one or more of the upper layer functions (e.g., data link, network, transport, session, presentation, and application) for upstream and/or downstream data (e.g., voice, text, audio, video, graphics, etc.). For instance, the CELL MAC unit 150 converts downstream data into a downstream cellular (CELL) PHY signal. The HH baseband processing module 106 converts the downstream CELL PHY signal into a downstream CELL symbol stream. The HH RF section 108 converts the downstream CELL symbol stream into a downstream CELL RF signal.

The HH RF section 108 also converts an upstream (US) CELL RF signal into an US CELL symbol stream. The HH baseband processing module 106 converts the UP CELL symbol stream into an US CELL PHY signal. The CELL MAC unit 150 converts the US CELL PHY signal into upstream data that is provided to memory for storage and/or to the IO devices for presentation (e.g., rendered audible and/or visible).

Figure 7:
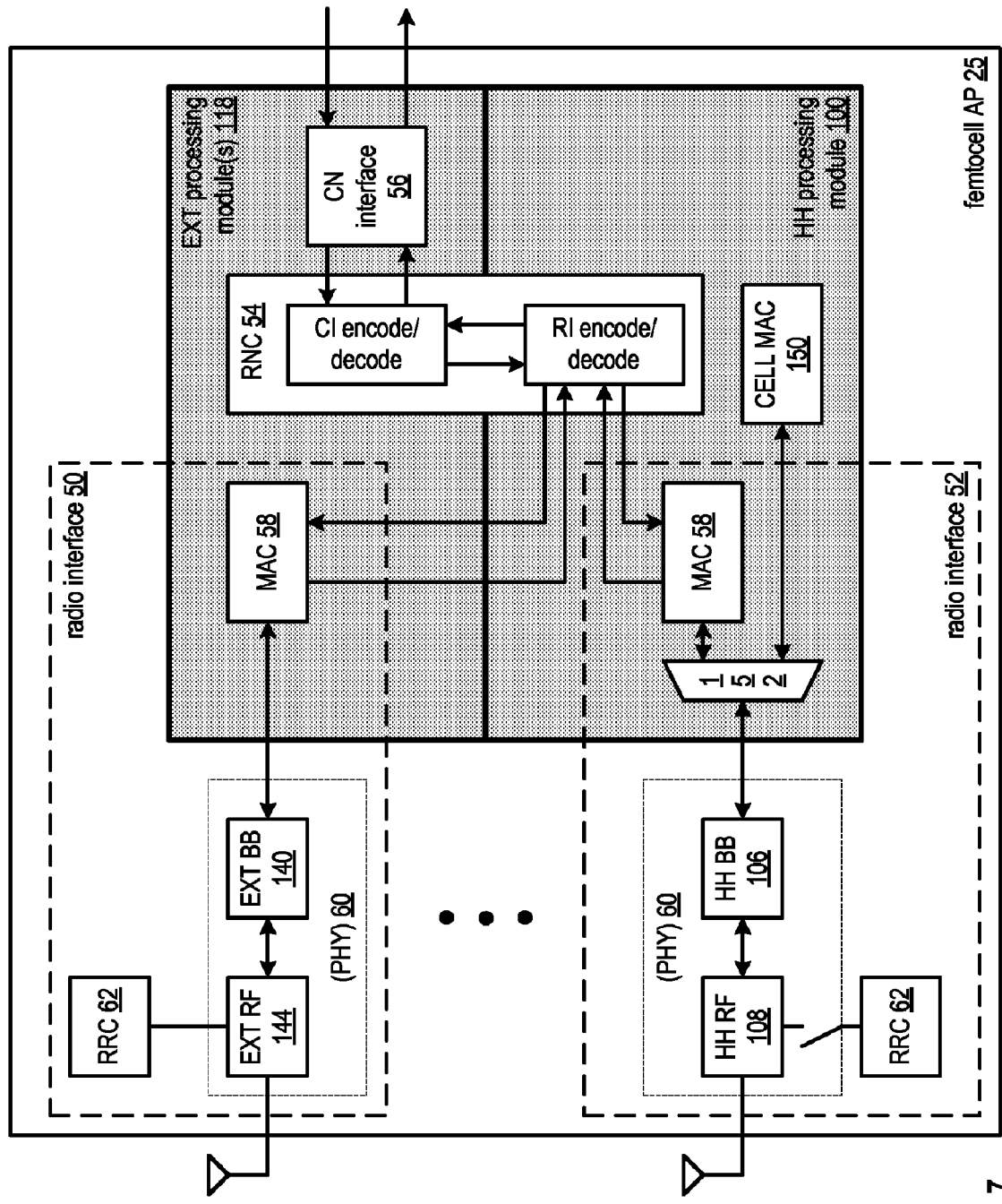
FIG. 7 is a schematic block diagram of another embodiment of a handheld computing unit and an extended computing unit implementing a femtocell AP in accordance with the present invention.

FIG. 7 is a schematic block diagram of another embodiment of a handheld (HH) computing unit 12 and an extended (EXT) computing unit 14 implementing a femtocell AP 25. The HH computing unit components include the HH processing module 100, the HH baseband processing module 106, and the HH RF section 108. The EXT computing unit components include the EXT processing module 118, the EXT baseband processing modules 140-142, and the EXT RF sections 144-146.

In this embodiment, the EXT processing module(s) 118 implements the CN interface and a combination of the HH processing module 100 and the EXT processing module(s) 118 implements the local radio network controller (RNC) 54. In particular, the EXT processing module(s) 118 implement a core network interface (CI) encoding/decoding function and the HH processing module 100 implements a radio interface (RI) encoding/decoding function. In general, the CI encoding/decoding function corresponds to formatting signals for the Iu interface with the core network, which may be done in accordance with one or more femtocell protocols (e.g., 3GPP TS 25.410: UTRAN Iu interface: General Aspects and Principles and other specifications referenced therein). The RI encoding/decoding corresponds to formatting signals for the Uu interface with the user equipment, which may be done in accordance with one or more femtocell protocols (e.g., 3GPP TS 25.301: Radio Interface Protocol Architectures and other specifications referenced therein).

In an example of operation, the RNC 54 receives a downstream (DS) core network interface (CI) signal from the CN interface 56. The CI encoding/decoding unit decodes the DS CI signal in accordance with the femtocell protocol to produce a decoded DS CI data signal. The EXT and/or the HH processing modules 100 and/or 118 perform one or more RNC functions upon the decoded DS CI data signal to produce a processed DS CI data signal. Such RNC functions include radio resource management, mobility management, and encryption/decryption of data to/from the user equipment 38-40. Radio resource management includes one or more of outer loop power control, load control, admission control, packet scheduling, handover control, macro-diversity combining, securing functions, and mobility management for user equipment within the femtocell APs coverage area.

The RI encoding/decoding unit (implemented by the HH processing module 100) encodes the processed DS CI data signal in accordance with one or more femtocell protocols to produce the DS radio interface (RI) signals (e.g., signals 82-84 of FIG. 4). The RI encoding/decoding unit also decodes upstream (US) RI signals in accordance with the one or more femtocell protocols to produce decoded US RI signals.

The EXT and/or the HH processing modules 100 and/or 118 perform one or more RNC functions upon the decoded US RI signals to produce processed US RI signals. The CI encoding/decoding unit (implemented by the EXT processing module 118) encodes the processed US RI signals to produce the US CI signal (e.g., signal 74 of FIG. 4).

Figure 8:
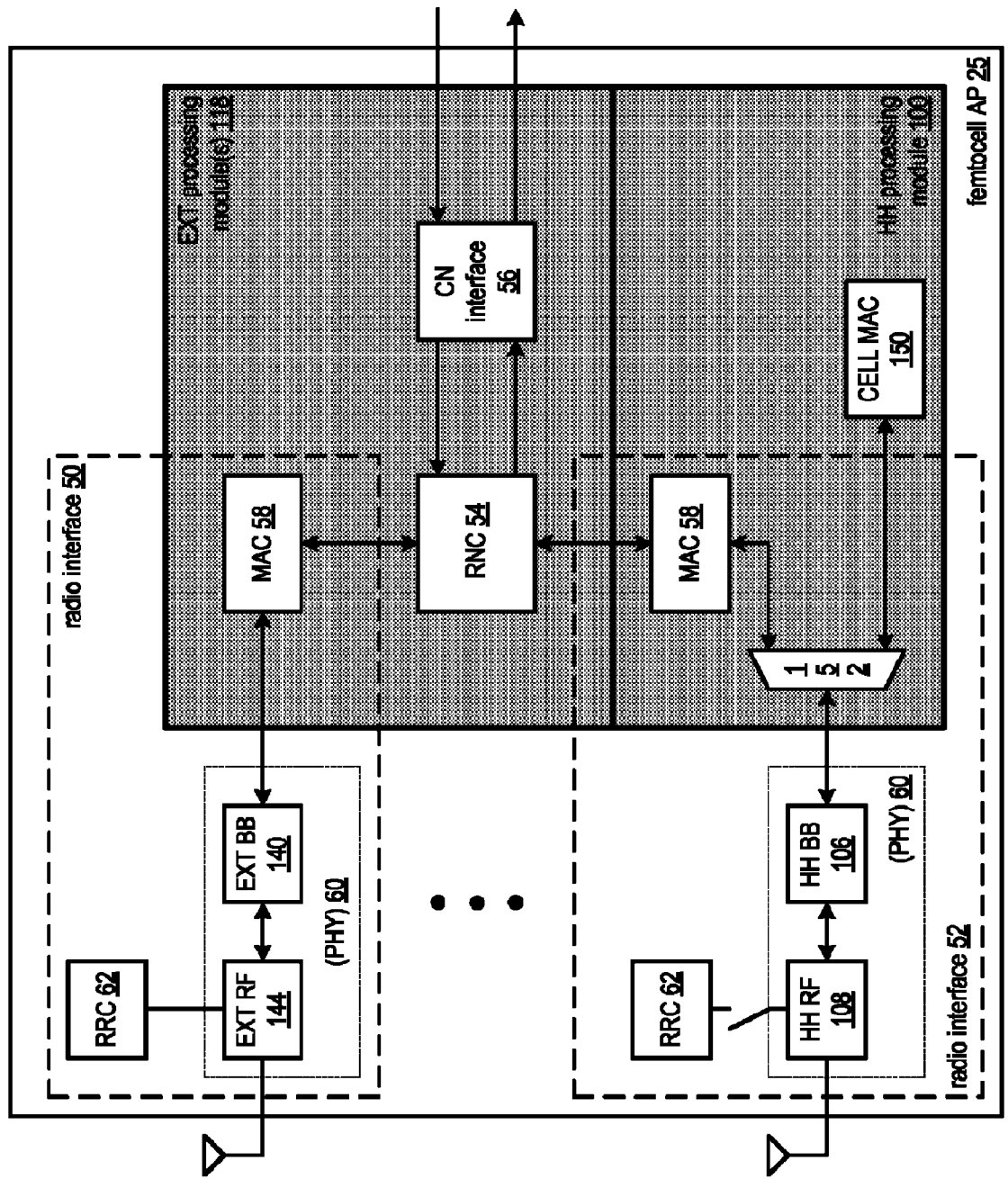
FIG. 8 is a schematic block diagram of another embodiment of a handheld computing unit and an extended computing unit implementing a femtocell AP in accordance with the present invention.

FIG. 8 is a schematic block diagram of another embodiment of a handheld (HH) computing unit 12 and an extended (EXT) computing unit 14 implementing a femtocell AP 25. The HH computing unit components include the HH processing module 100, the HH baseband processing module 106, and the HH RF section 108. The EXT computing unit components include the EXT processing module 118, the EXT baseband processing modules 140-142, and the EXT RF sections 144-146.

In this embodiment, the EXT processing module(s) 118 implements the CN interface 56, the RNC 54, and the MAC units 58 for the radio interfaces 50. The HH processing module 100 implements the MAC unit 58 for the radio interfaces 52. For example, the EXT processing module operably coupled to perform the core network interface function and the local radio control network function. In addition, the EXT processing module 118 performs the MAC function to facilitate conversion of a first one of the plurality of downstream RI signals into a first one of the plurality of downstream PHY AP signals and a first one of the plurality of upstream PHY AP signals into a first one of the plurality of upstream RI signals. For instance, the first US PHY AP signal may be signal 68 of FIG. 4 and the first DS PHY AP signal may be signal 86 of FIG. 4.

In this example, the HH processing module performs the MAC function to facilitate conversion of a second one of the plurality of downstream RI signals into a second one of the plurality of downstream PHY AP signals and a second one of the plurality of upstream PHY AP signals into a second one of the plurality of upstream RI signals. For instance, the second US PHY AP signal may be the signal provided by the HH baseband processing module 106 to the MAC unit 58 (implemented by the HH processing module 100) and the DS PHY AP signal may be the signal provided by the MAC unit 50 to the HH baseband processing module 106.

Figure 9:
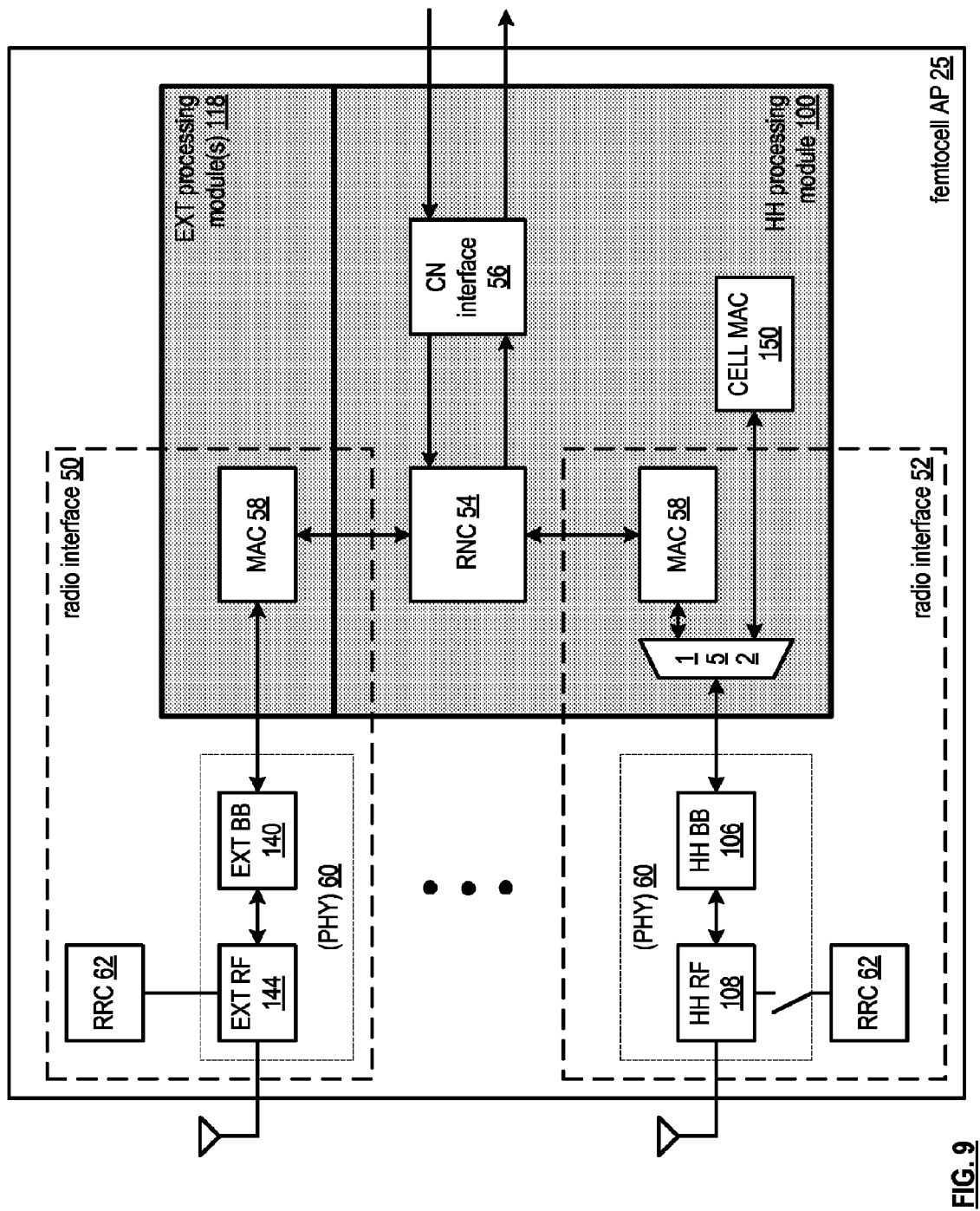
FIG. 9 is a schematic block diagram of another embodiment of a handheld computing unit and an extended computing unit implementing a femtocell AP in accordance with the present invention.

FIG. 9 is a schematic block diagram of another embodiment of a handheld (HH) computing unit 12 and an extended (EXT) computing unit 14 implementing a femtocell AP 25. The HH computing unit components include the HH processing module 100, the HH baseband processing module 106, and the HH RF section 108. The EXT computing unit components include the EXT processing module 118, the EXT baseband processing modules 140-142, and the EXT RF sections 144-146.

In this embodiment, the EXT processing module(s) 118 implements the MAC units 58 for the radio interfaces 50. The HH processing module 100 implements the CN interface 56, the RNC 54, and the MAC unit 58 for the radio interfaces 52.

Figure 10:
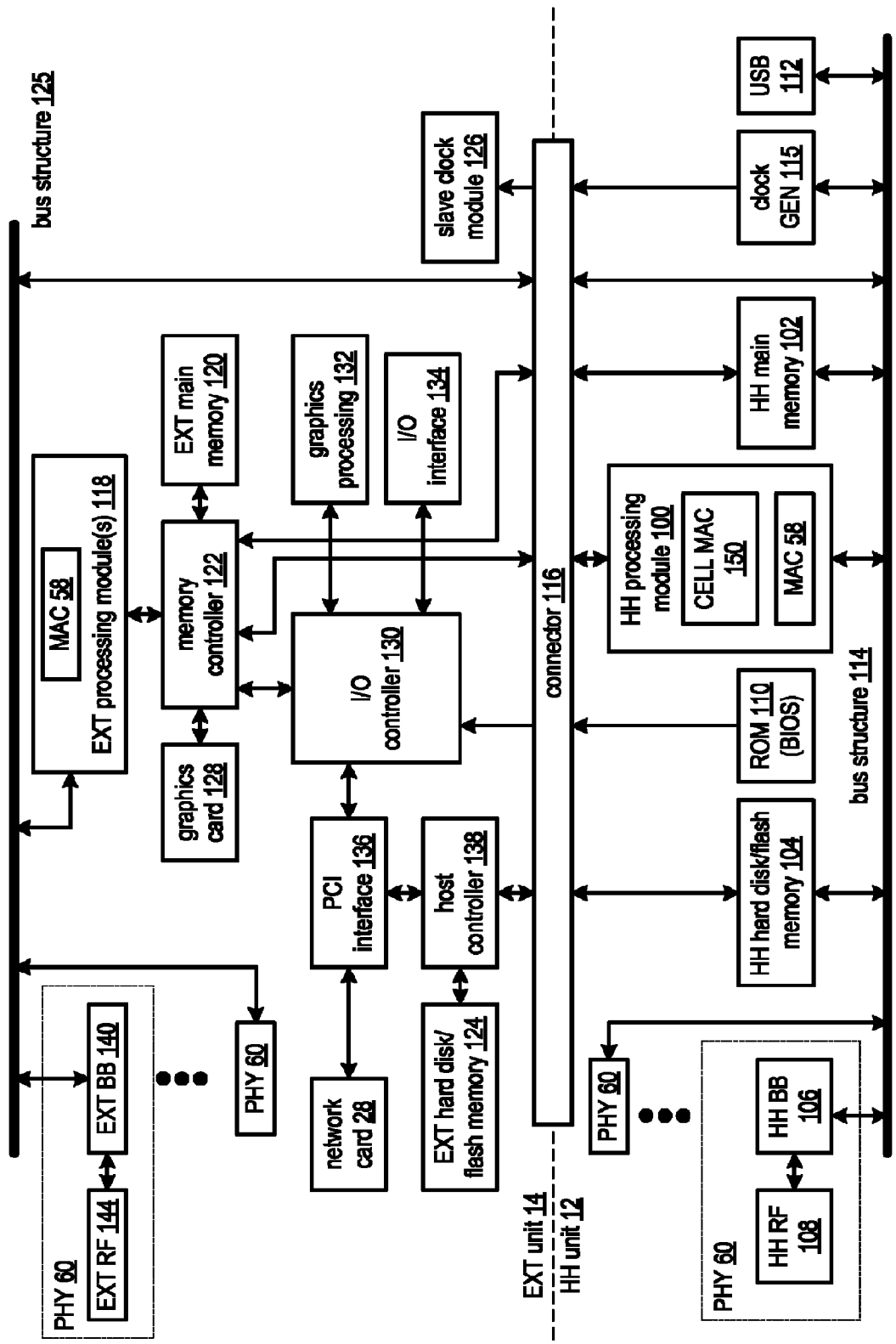
FIG. 10 is a schematic block diagram of another embodiment of a handheld computing unit and an extended computing unit in accordance with the present invention.

FIG. 10 is a schematic block diagram of another embodiment of core components of a handheld computing unit 12 coupled via connector 116 to an extended computing unit 14. The handheld (HH) computing unit 12 includes the HH processing module 100, the HH main memory 102, the HH hard disk/flash memory 104, a plurality of PHY units (e.g., a plurality of baseband processing modules 106 and a plurality of RF sections 108), the ROM 110, the universal serial bus (USB) interface 112, the bus structure 114, and the clock generation circuit 115. The extended (EXT) computing unit 14 includes the one or more EXT processing modules 118, the EXT main memory 120, the slave clock module 126, the memory controller 122, the graphics card 128 and/or the graphics processing unit 132, the I/O controller 130, the I/O interface 134, the peripheral component interconnect (PCI) interface 136, the host controller 138, the EXT hard disk/flash memory 124, the network card 28, the bus structure 125, and a plurality of PHY units 60 (e.g., the plurality of EXT baseband (BB) processing modules 140-142 and the plurality of RF sections 144-146).

In this embodiment, the EXT baseband processing modules 140-142 and the RF sections 144-146 are operable when the HH computing unit is docked to the EXT computing unit. Alternatively, when the HH computing unit is not docked, the EXT computing unit 14 may function as the femtocell AP using its baseband processing modules and RF sections. When operable, each combination of the EXT baseband processing modules 140-142 and the RF sections 144-146 provides at least a portion of a radio interface 50 of the femtocell AP 25. In addition, the EXT processing module 118 provides the MAC unit 58 for the radio interface 50.

Each combination of HH baseband processing modules 106 and HH RF sections 108 provides at least a portion of a radio interface 52 of the femtocell AP 25 when the HH unit is in the femtocell mode (e.g., docked to the EXT unit). In addition, the HH processing module 100 provides the MAC unit 58 for the radio interface 52. When the HH unit is in the cellular mode (e.g., not docked to the EXT unit), each combination of HH baseband processing modules 106 and HH RF sections 108 provides a separate RF transceiver, which may be used independently to provide multi-mode service. In this mode, the HH processing module 100 provides the CELL MAC unit 150.

Figure 11:
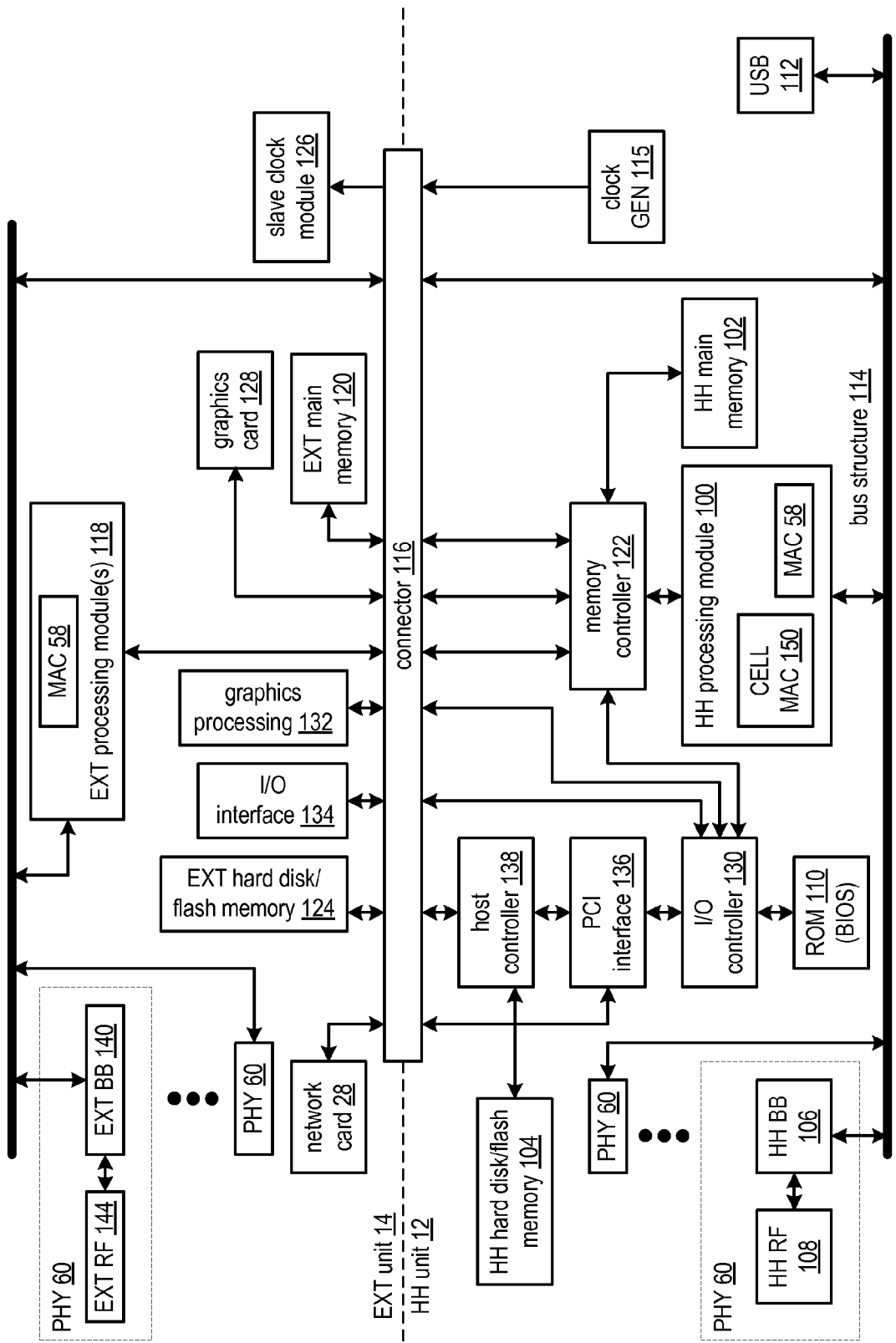
FIG. 11 is a schematic block diagram of another embodiment of a handheld computing unit and an extended computing unit in accordance with the present invention.

FIG. 11 is a schematic block diagram of another embodiment of core components of a handheld computing unit 12 coupled via connector 116 to an extended computing unit 14. The handheld (HH) computing unit 12 includes the HH processing module 100, the HH main memory 102, the HH hard disk/flash memory 104, a plurality of PHY units (e.g., a plurality of baseband processing modules 106 and a plurality of RF sections 108), the ROM 110, the universal serial bus (USB) interface 112, the bus structure 114, the memory controller 122, the I/O controller 130, the peripheral component interconnect (PCI) interface 136, and the clock generation circuit 115. The extended (EXT) computing unit 14 includes the one or more EXT processing modules 118, the EXT main memory 120, the slave clock module 126, the graphics card 128 and/or the graphics processing unit 132, the I/O interface 134, the host controller 138, the EXT hard disk/flash memory 124, the network card 28, the bus structure 125, and a plurality of PHY units 60 (e.g., the plurality of EXT baseband (BB) processing modules 140-142 and the plurality of RF sections 144-146).

In this embodiment, the HH unit 12 and the EXT unit 14 function as previously discussed to provide a femtocell AP 25. When the HH unit 12 is in a cellular mode (e.g., not docked to the EXT unit 14), the EXT unit 14 is disabled and the HH unit 12 provides cellular functions and other functions as discussed in the above referenced parent patent application.

Figure 12:
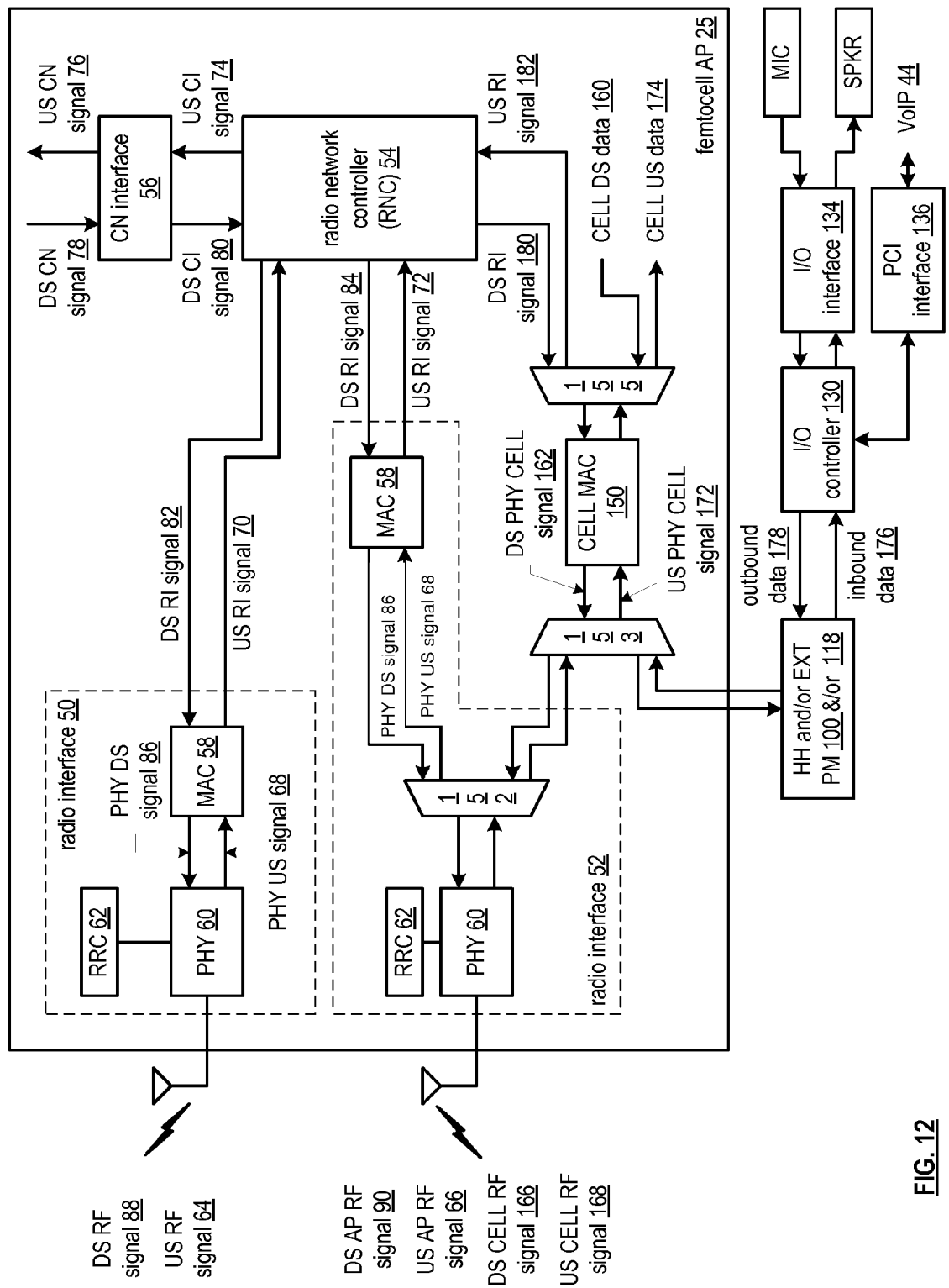
FIG. 12 is a schematic block diagram of another embodiment of a handheld computing unit and an extended computing unit implementing a femtocell AP in accordance with the present invention.

FIG. 12 is a schematic block diagram of another embodiment of a handheld computing unit 12 and an extended computing unit 14 implementing a femtocell AP 25. The combination of the HH unit 12 and the EXT unit 14 implements the CN interface 56, the radio network controller (RNC) 54, the radio interfaces 50-52, multiplexers 152, 153, and 155. The radio interfaces 50-52 include the MAC unit 58, the PHY unit 60, and the radio resource controller (RRC) 62.

In an example of operation, the CN interface 56 receives a downstream (DS) core network (CN) signal 76 from an upstream network component. The DS CN signal 76 is formatted in accordance with an internet protocol (IP) transmission scheme (e.g., TCP/IP, etc.). The content of the DS CN signal 76 includes user data and/or system data that is formatted in accordance with a particular cellular telephone interface protocol (e.g., 3GPP TS 25.410 UTRAN Iu Interface: General Aspects and Principles and other specifications referenced therein).

The CN interface 56 converts the DS CN signal 78 in a downstream (DS) CN interface (CI) signal 80. For example, the CN interface 56 recovers the content of the DS CN signal 78 by removing the IP transmission scheme overhead information. The CN interface provides the recovered CS CI signal 80 to the radio network controller (RNC) 54.

The RNC 54 converts the DS CI signal 80 into one or more downstream (DS) radio interface (RI) signals 82-84 and 180. For instance, if the DS CI signal 80 includes user data and/or system data for the HH unit 12 and one or more user equipment 38-40, the RNC 54 partitions the signal for the respective user devices (e.g., HH unit and the user equipment). When the DS RI signals are for the user equipment, the RNC 54 provide them to the respective radio interfaces 50-52. When one of the DS RI signals 180 is for the HH unit 12, the RNC 54 provides the signal 180 to the CELL MAC unit 150 via the multiplexer 155.

In this instance, the one or more PHY units 60 (e.g., HH BB processing modules and HH RF sections) of the HH unit are used by the femtocell AP 25 to support cellular communication with one of the user equipment. For cellular communications with the HH unit 12, the RNC 54 provides the RI signal to the CELL MAC 150 instead of a radio interface 50-52.

The CELL MAC unit 150 processes the DS RI signal 180 as previously discussed to produce a downstream PHY CELL signal 162. Multiplexer 153 provides the downstream PHY CELL signal 162 to the HH and/or EXT processing modules 118, which convert the downstream PHY CELL signal 162 into inbound, or downstream, data 176 (e.g., voice, text, audio, video, graphics, etc.). Such a conversion may include a decompression of compressed data contained in the PHY CELL signal, format conversion (e.g., Pulse Code Modulation to MP3), etc. The IO controller 130 forwards the inbound data 176 to the IO interface 134, which provides the data 176 to a speaker assembly SPKR (e.g., one or more speakers).

For the other DS RI signals 82-84, the corresponding MAC units 58 converts the DS RI signal 82-84 into a physical layer (PHY) downstream (DS) signal 86 in accordance with one or more femtocell protocols. The corresponding PHY units 60 convert the PHY DS signal 86 into a downstream (DS) radio frequency (RF) signal 88-90 in accordance with one or more femtocell protocols. The radio resource control (RRC) unit 62 provides network layer functionality for the radio interface 50-52.

The corresponding PHY units 60 also convert an upstream (US) RF signal 64-66 into a PHY US signal 68 in accordance with one or more femtocell protocols. The corresponding MAC units 58 convert the PHY US signal 68 into a US RI signal 70-72 in accordance with one or more femtocell protocols.

For upstream cellular communications from the HH unit 12, the HH and/or EXT processing modules 100 and/or 118 provide a US PHY CELL signal 172 to the CELL MAC unit 150 via multiplexer 153. The US PHY CELL signal 172 may be user data and/or system data. For user data, the HH and/or EXT processing modules may retrieve it from memory or receive it from the IO controller 130. For user data received from the IO controller 130, the outbound, or upstream, data 178 may be audio data received via a microphone MIC and the IO interface 134.

The CELL MAC unit 150 converts the US PHY CELL signal 172 in an upstream (US) RI signal 182 in accordance with one or more cellular communication protocols (e.g., GSM, CDMA, WCDMA, HSUPA, HSDPA, EDGE, GPRS, LTE, UMTS, EV-DO, etc.). The CELL MAC unit 150 provides the US RI signal 182 to the RNC 54 via multiplexer 155. Note that multiplexers 152, 153, and 155 may each be logical multiplexers, physical multiplexers, and/or switching circuits.

The radio network controller (RNC) 54 converts the US RI signals 70-72 and the US RI signal 182 into a US CI signal 74 in accordance with one or more femtocell protocols (e.g., 3GPP TS 25.401 UTRAN overall description and specifications reference therein). The CN interface 56 converts the US CI signal 74 into a US CN signal 76.

Figure 13:
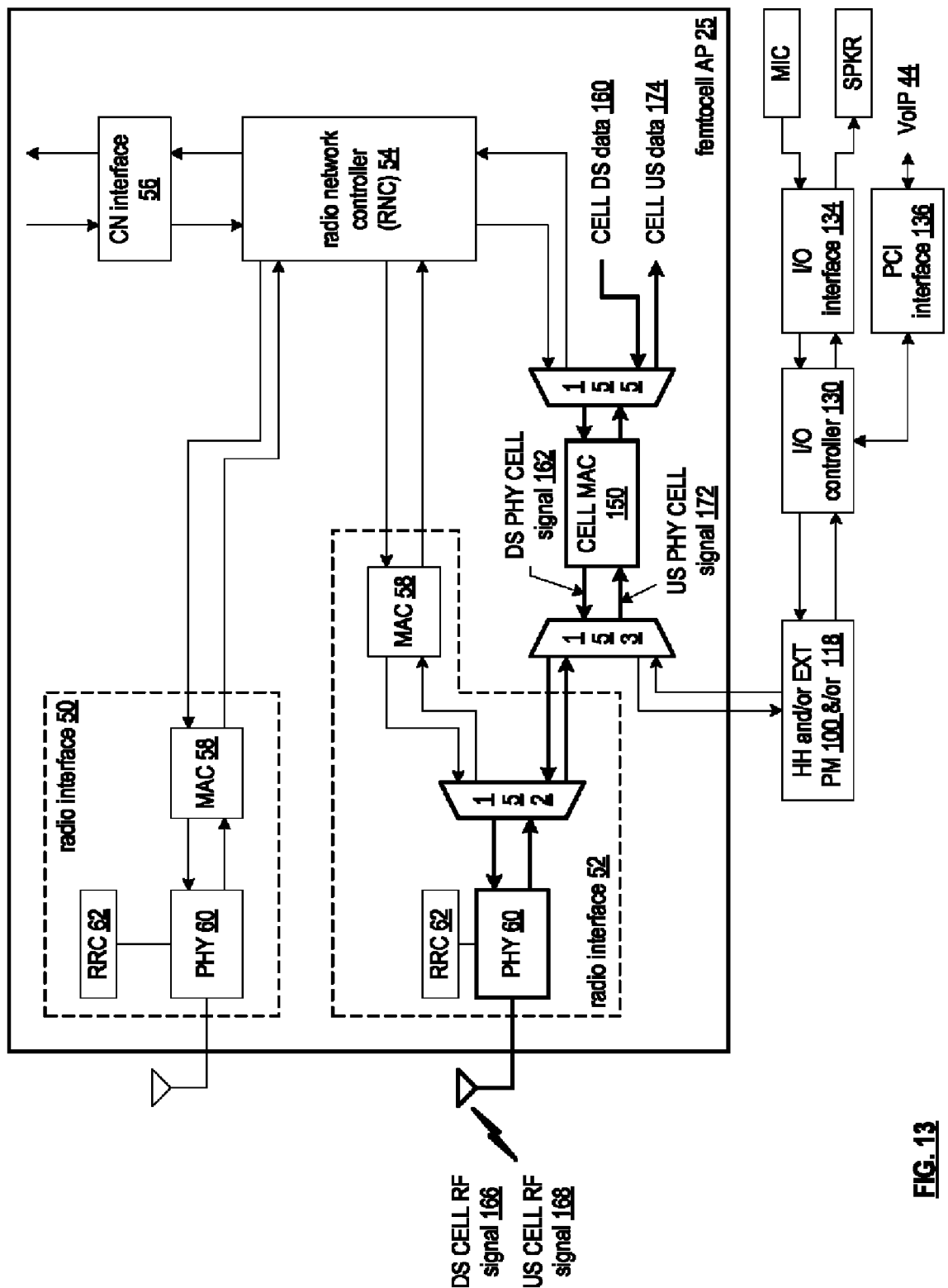
FIG. 13 is a schematic block diagram of an example of a handheld computing unit and an extended computing unit in a cellular mode in accordance with the present invention.

FIG. 13 is a schematic block diagram of an example of a handheld computing unit 12 and an extended computing unit 14 of FIG. 12 in a cellular mode. In this mode, the HH unit 12 is in a stand-alone mode (e.g., is not docked to the EXT unit 14). The light lines indicate inactive components and interconnections therebetween and the darker lines indicate active components and interconnections therebetween. In this example, the CELL MAC unit 150 and the PHY unit 60 (e.g., HH BB processing module and HH RF section) of the HH unit 12 are active.

The CELL MAC unit 150 receives cellular downstream (CELL DS) data 160 from the HH processing module, from an input component (e.g., microphone and corresponding audio processing circuitry), and/or from the HH main memory. The CELL MAC unit 150 converts the CELL DS data 160 into the DS PHY CELL signal 162. The PHY unit 60 converts the DS PHY CELL signal 162 into a DS CELL RF signal 166.

The PHY unit 60 also converts an upstream (US) RF signal 168 into a US PHY CELL signal 172. The CELL MAC unit 150 converts the US PHY CELL signal 172 into CELL US data 174, which is provided to the HH processing module, the HH main memory, and/or to the IO controller of the HH unit.

Figure 14:
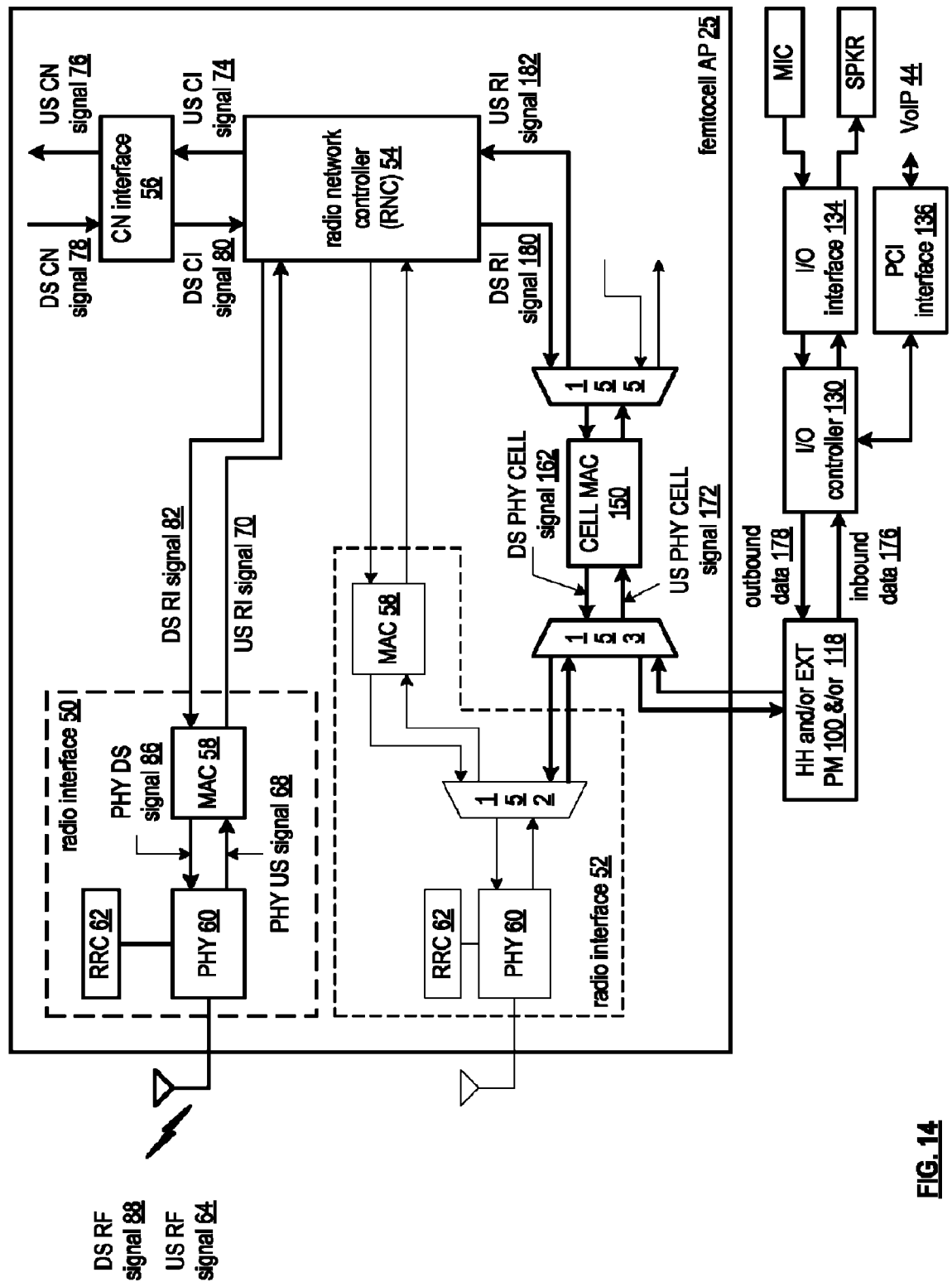
FIG. 14 is a schematic block diagram of an example of a handheld computing unit and an extended computing unit in a femtocell AP mode in accordance with the present invention.

FIG. 14 is a schematic block diagram of an example of a handheld computing unit 12 and an extended computing unit 14 of FIG. 12 in a femtocell AP mode where the HH unit 12 is involved in a cellular communication and the radio interface 52 that includes the PHY unit 60 of the HH unit is not supporting a cellular communication with user equipment. The active components (e.g., the ones with darker lines) function as discussed with referenced to FIG. 12 to support the HH unit cellular communication and user equipment cellular communication via radio interface 50.

Figure 15:
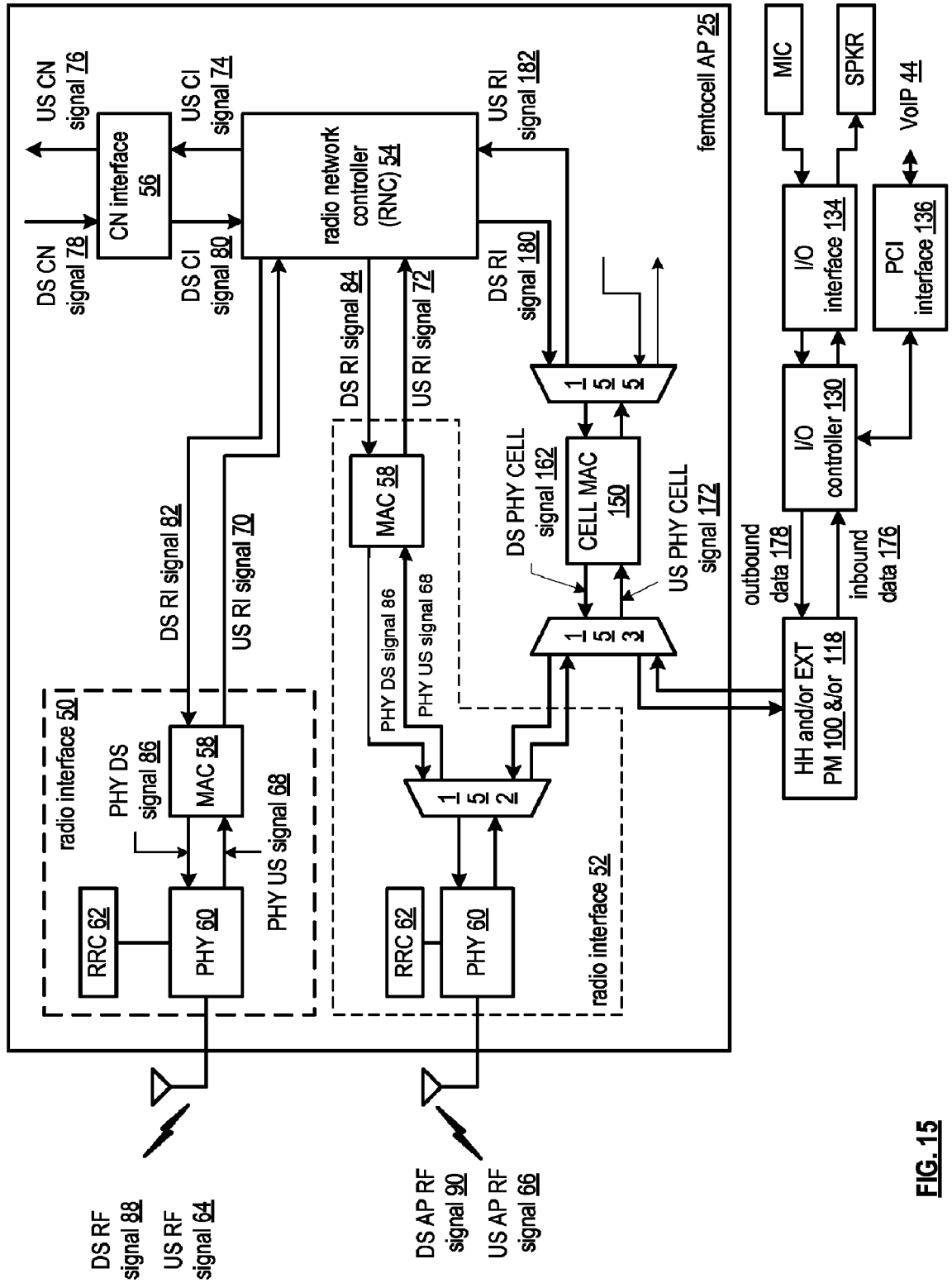
FIG. 15 is a schematic block diagram of another example of a handheld computing unit and an extended computing unit in a femtocell AP mode in accordance with the present invention.

FIG. 15 is a schematic block diagram of another example of a handheld computing unit 12 and an extended computing unit 14 of FIG. 12 in a femtocell AP mode where the HH unit 12 is involved in a cellular communication and the radio interface 52 that includes the PHY unit 60 of the HH unit is not supporting a cellular communication with user equipment. The active components (e.g., the ones with darker lines) function as discussed with referenced to FIG. 12 to support the HH unit cellular communication and user equipment cellular communication via radio interface 50.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:
1. A computing unit comprises:
 a processing module for operating in femtocell access point (AP) mode when the computing unit is coupled to an extended computing unit and in a cellular (CELL)

mode when the computing unit is not coupled to the extended computing unit, the processing module operably coupled to:
in the femtocell AP mode:
perform at least a portion of a Medium Access Control (MAC) function to facilitate conversion of:
a downstream radio interface (RI) signal into a downstream physical layer (PHY) AP signal; and
an upstream PHY AP signal into an upstream RI signal; and
in the CELL mode:
convert downstream data into a downstream PHY CELL signal; and
convert an upstream PHY CELL signal into upstream data;
a baseband processing module operably coupled to:
in the femtocell AP mode:
convert the downstream PHY AP signal into a downstream AP symbol stream; and
convert an upstream AP symbol stream into the upstream PHY AP signal; and
in the cellular mode:
convert the downstream PHY CELL signal into a downstream CELL symbol stream; and
convert an upstream CELL symbol stream into the upstream PHY CELL signal; and
a radio frequency (RF) section operably coupled to:
in the femtocell AP mode:
convert the downstream AP symbol stream into a downstream RF AP signal; and
convert an upstream RF AP signal into the upstream AP symbol stream; and
in the CELL mode:
convert the downstream CELL symbol stream into a downstream RF CELL signal; and
convert an upstream RF CELL signal into the upstream CELL symbol stream;
wherein the computing unit is a handheld computing unit.

2. The computing unit of claim 1, wherein the processing module is further operably coupled to, in the femtocell AP mode to:
perform at least a portion of a local radio control network function to facilitate conversion of:
a downstream control network interface (CI) signal into the downstream RI signal; and
the upstream RI signal into an upstream CI signal.

3. The computing unit of claim 1, wherein the processing module is further operably coupled to, in the femtocell AP mode to:
perform at least a portion of a core network interface function to facilitate conversion of:
a downstream core network (CN) signal into a downstream core network interface (CI) signal; and
an upstream CI signal into an upstream CN signal; and
perform at least a portion of a local radio control network function to facilitate conversion of:
the downstream (CI) signal into the downstream RI signal; and
the upstream RI signal into the upstream CI signal.

4. The computing unit of claim 1 further comprises:
a docking interface coupled to at least the processing module, wherein the docking interface provides coupling of the computing unit to the extended computing unit.

5. The computing unit of claim 4 further comprises, in the femtocell AP mode:

the processing module is further operably coupled to:
convert the downstream data into the downstream PHY CELL signal;
provide the downstream PHY CELL signal to the docking interface, wherein the extended computing unit recovers inbound data from the downstream PHY CELL signal and presents the inbound data;
receive, via the docking interface, the upstream PHY CELL signal from the extended computing unit, wherein the extended computing unit generates the upstream PHY CELL signal from outbound data; and
convert the upstream PHY CELL signal into the upstream data.

6. The computing unit of claim 1, wherein at least one of the baseband processing module and the RF section are further operably coupled to perform at least one of:
macro-diversity distribution and combining;
soft handover execution;
error detection on transport channels;
forward error correction encoding and decoding of the transport channels;
multiplexing of the transport channels;
demultiplexing of coded composite transport channels;
rate matching of the coded transport channels to physical channels;
mapping of the coded composite transport channels on the physical channels;
power weighting and combining of the physical channels;
modulation and spreading demodulation of the physical channels;
de-spreading of the physical channels;
frequency and time synchronization;
beamforming; and
Multiple Input Multiple Output (MIMO) transmission.

7. The computing unit of claim 1 further comprises:
the processing module operably coupled to perform at least a portion of a radio resource control (RRC) function to facilitate one or more of:
broadcast information related to non-access stratum;
broadcast information related to access stratum;
processing of an RRC connection;
processing of radio bearers;
processing radio resources for the RRC connection;
performing RRC connection mobility functions;
controlling requested quality of service;
power control;
processing initial cell selection and cell re-selection;
arbitration of the radio resources on an uplink dedicate channel;
RRC message integrity protection;
cell broadcast service control; and
multimedia broadcast multicast service control.

8. The computing unit of claim 1 further comprises:
one or more integrated circuits that support the processing module, the baseband processing module, and the RF section.

9. The computing unit of claim 1 further comprises:
a second baseband processing module operably coupled to:
in the femtocell AP mode:
convert a second downstream PHY AP signal into a second downstream AP symbol stream; and
convert a second upstream AP symbol stream into a second upstream PHY AP signal; and
in the cellular mode:
convert a second downstream PHY CELL signal into a second downstream CELL symbol stream; and convert a second upstream CELL symbol stream into a second upstream PHY CELL signal; and a second radio frequency (RF) section operably coupled to:

in the femtocell AP mode:
convert the second downstream AP symbol stream into a second downstream RF AP signal; and
convert a second upstream RF AP signal into the second upstream AP symbol stream; and in the CELL mode:
convert the second downstream CELL symbol stream into a second downstream RF CELL signal; and
convert a second upstream RF CELL signal into the second upstream CELL symbol stream.

10. The computing unit of claim 1 wherein the processing module is further operably coupled to enable data transfer between the computing unit and the extended computing unit in the femtocell AP mode.

11. The computing unit of claim 1 wherein the processing module, baseband processing module and RF section are further operable coupled to wirelessly communicate with a base station to participate in cellular communications in the CELL mode.

12. A computing unit comprises:
a processing module for operating in femtocell access point (AP) mode when the computing unit is coupled to an extended computing unit and in a cellular (CELL) mode when the computing unit is not coupled to the extended computing unit, the processing module operably coupled to:

in the femtocell AP mode:
perform at least a portion of a Medium Access Control (MAC) function to facilitate conversion of:
a plurality of downstream RI signals into a plurality of downstream physical layer (PHY) AP signals; and
convert a plurality of upstream PHY AP signals into a plurality of upstream RI signals; and in the (CELL) CELL mode:
convert downstream data into a downstream PHY CELL signal; and
convert an upstream PHY CELL signal into upstream data;

a plurality of radio modules, a radio module of the plurality of radio modules includes:
a baseband processing module operably coupled to:
in the femtocell AP mode:
convert one of the plurality of downstream PHY AP signals into a downstream AP symbol stream; and
convert an upstream AP symbol stream into one of the plurality of upstream PHY AP signals; and in the cellular mode:
convert the downstream PHY CELL signal into a downstream CELL symbol stream; and
convert an upstream CELL symbol stream into the upstream PHY CELL signal; and a radio frequency (RF) section operably coupled to:
in the femtocell AP mode:
convert the downstream AP symbol stream into a downstream RF AP signal; and
convert an upstream RF AP signal into the upstream AP symbol stream; and in the cellular mode:
convert the downstream CELL symbol stream into a downstream RF CELL signal; and
convert an upstream RF CELL signal into the upstream CELL symbol stream;

wherein the computing unit is a handheld computing unit.

13. The computing unit of claim 12, wherein the processing module is further operably coupled to, in the femtocell AP mode to:
perform at least a portion of a local radio control network function to facilitate conversion of:
a downstream control network interface (CI) signal into the plurality of downstream RI signals; and
the plurality of upstream RI signals into an upstream CI signal.

14. The computing unit of claim 12, wherein the processing module is further operably coupled to, in the femtocell AP mode to:
perform at least a portion of a core network interface function to facilitate conversion of:
a downstream core network (CN) signal into a downstream core network interface (CI) signal; and
an upstream CI signal into an upstream CN signal; and
perform at least a portion of a local radio control network function to facilitate conversion of:
the downstream (CI) signal into the plurality of downstream RI signals; and
the plurality of upstream RI signals into the upstream CI signal.

15. The computing unit of claim 12 further comprises:
a docking interface coupled to at least the processing module, wherein the docking interface provides coupling of the computing unit to the extended computing unit.

16. The computing unit of claim 15 further comprises, in the femtocell AP mode:
the processing module is further operably coupled to:
convert the downstream data into the downstream PHY CELL signal;
provide the downstream PHY CELL signal to the docking interface, wherein the extended computing unit recovers inbound data from the downstream PHY CELL signal and presents the inbound data;
receive, via the docking interface, the upstream PHY CELL signal from the extended computing unit, wherein the extended computing unit generates the upstream PHY CELL signal from outbound data; and
convert the upstream PHY CELL signal into the upstream data.

17. The computing unit of claim 12 further comprises:
the processing module operably coupled to perform at least a portion of a radio resource control (RRC) function to facilitate one or more of:
broadcast information related to non-access stratum;
broadcast information related to access stratum;
processing of an RRC connection;
processing of radio bearers;
processing radio resources for the RRC connection;
performing RRC connection mobility functions;
controlling requested quality of service;
power control;
processing initial cell selection and cell re-selection;
arbitration of the radio resources on an uplink dedicate channel;
RRC message integrity protection;
cell broadcast service control; and
multimedia broadcast multicast service control.

18. The computing unit of claim 12 further comprises:
one or more integrated circuits that support the processing module, the baseband processing module, and the RF section.

19. The computing unit of claim 12, wherein at least one of the baseband processing module and the RF section are further operably coupled to perform at least one of:
- macro-diversity distribution and combining;
- soft handover execution;
- error detection on transport channels;
- forward error correction encoding and decoding of the transport channels;
- multiplexing of the transport channels;
- demultiplexing of coded composite transport channels;
- rate matching of the coded transport channels to physical channels;
- mapping of the coded composite transport channels on the physical channels;
- power weighting and combining of the physical channels;
- modulation and spreading demodulation of the physical channels;
- de-spreading of the physical channels;
- frequency and time synchronization;
- beamforming; and
- Multiple Input Multiple Output (MIMO) transmission.

20. The computing unit of claim 12 further comprises:
- a second radio module of the plurality of radio modules that includes:
  - a second baseband processing module operably coupled to:
    - in the femtocell AP mode:
      - convert a second downstream PHY AP signal into a second downstream AP symbol stream; and
      - convert a second upstream AP symbol stream into a second upstream PHY AP signal; and
    - in the cellular mode:
      - convert a second downstream PHY CELL signal into a second downstream CELL symbol stream; and
      - convert a second upstream CELL symbol stream into a second upstream PHY CELL signal; and
  - a second radio frequency (RF) section operably coupled to:
    - in the femtocell AP mode:
      - convert the second downstream AP symbol stream into a second downstream RF AP signal; and
      - convert a second upstream RF AP signal into the second upstream AP symbol stream; and
    - in the CELL mode:
      - convert the second downstream CELL symbol stream into a second downstream RF CELL signal; and
      - convert a second upstream RF CELL signal into the second upstream CELL symbol stream.

* * * * *

UNITED STATES PATENT AND TRADEMARK OFFICE
CERTIFICATE OF CORRECTION

PATENT NO.        : 8,279,803 B2
APPLICATION NO.   : 12/495212
DATED             : October 2, 2012
INVENTOR(S)       : Ahmadreza Rofougaran It is certified that error appears in the above-identified patent and that said Letters Patent is hereby corrected as shown below:

In the Claims

Col. 19, line 20, in claim 11: replace "operable coupled" with --operably coupled--

Signed and Sealed this
Seventeenth Day of September, 2013

Teresa Stanek Rea
*Deputy Director of the United States Patent and Trademark Office*